United States Patent
Montgomery et al.

(10) Patent No.: US 6,845,198 B2
(45) Date of Patent: Jan. 18, 2005

(54) HIGH-SPEED SILICON-BASED ELECTRO-OPTIC MODULATOR

(75) Inventors: Robert Keith Montgomery, Easton, PA (US); Margaret Ghiron, Allentown, PA (US); Prakash Gothoskar, Allentown, PA (US); Vipulkumar Patel, Monmouth Junction, NJ (US); Kalpendu Shastri, Orefield, PA (US); Soham Pathak, Allentown, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 10/795,748

(22) Filed: Mar. 8, 2004

(65) Prior Publication Data

US 2004/0208454 A1 Oct. 21, 2004

Related U.S. Application Data

(60) Provisional application No. 60/457,242, filed on Mar. 25, 2003.

(51) Int. Cl.$^7$ ................................................. G02B 6/26
(52) U.S. Cl. .......................... 385/50; 385/14; 385/39; 385/40; 359/245
(58) Field of Search ........................... 385/14, 39, 40, 385/50; 359/245

(56) References Cited

U.S. PATENT DOCUMENTS

| | | | |
|---|---|---|---|
| 4,787,691 A | 11/1988 | Lorenzo et al. | |
| 5,140,652 A | 8/1992 | Diemeer | |
| 5,350,935 A | * 9/1994 | Temple | 257/147 |
| 5,466,348 A | * 11/1995 | Holm-Kennedy | 205/775 |
| 5,757,986 A | 5/1998 | Crampton et al. | |
| 5,908,305 A | 6/1999 | Crampton et al. | |
| 5,936,300 A | 8/1999 | Sasada et al. | |
| 5,939,742 A | * 8/1999 | Yiannoulos | 257/292 |
| 6,103,008 A | 8/2000 | McKee et al. | |
| 6,233,070 B1 | 5/2001 | Lu et al. | |
| 6,298,177 B1 | 10/2001 | House | |
| 6,323,985 B1 | 11/2001 | Maloney | |
| 6,374,003 B1 | 4/2002 | Ding et al. | |
| 6,480,641 B1 | 11/2002 | Ding et al. | |
| 6,483,954 B2 | 11/2002 | Koehl et al. | |
| 6,493,497 B1 | 12/2002 | Ramdani et al. | |
| 6,501,867 B2 | 12/2002 | Gates, II et al. | |
| 6,516,458 B1 | 2/2003 | Fukui | |
| 6,522,462 B2 | 2/2003 | Chu et al. | |
| 6,552,838 B2 | 4/2003 | Ransijn et al. | |
| 6,584,239 B1 | 6/2003 | Dawnay et al. | |
| 6,621,128 B2 | 9/2003 | Lee et al. | |
| 6,635,561 B2 | 10/2003 | Kawai et al. | |
| 2003/0025070 A1 | * 2/2003 | Deliwala | 250/216 |

OTHER PUBLICATIONS

1) Zhiyuan Cheng et al. "Fully Depleted Strained–Join–and P–MOSFETS on Bonded SGOI Substrates and Study of the Sige/Box Interface" IEEE Electron Device Letters, vol 25., No. 3, Mar. 2004.

(List continued on next page.)

Primary Examiner—Ellen E. Kim

(57) ABSTRACT

A silicon-based electro-optic modulator is based on forming a gate region of a first conductivity to partially overly a body region of a second conductivity type, with a relatively thin dielectric layer interposed between the contiguous portions of the gate and body regions. The modulator may be formed on an SOI platform, with the body region formed in the relatively thin silicon surface layer of the SOI structure and the gate region formed of a relatively thin silicon layer overlying the SOI structure. The doping in the gate and body regions is controlled to form lightly doped regions above and below the dielectric, thus defining the active region of the device. Advantageously, the optical electric field essentially coincides with the free carrier concentration area in this active device region. The application of a modulation signal thus causes the simultaneous accumulation, depletion or inversion of free carriers on both sides of the dielectric at the same time, resulting in high speed operation.

134 Claims, 16 Drawing Sheets

OTHER PUBLICATIONS

2) C. Z. Zhao, et al. "Silicon on Insulator Mach Zehnder Waveguide Interferometers operating at 1.3 um", Appl. Phys. Lett. 67(17) Oct. 23, 1995.

3) P. Dainesi et al. "CMOS Compatible Fully Integrated Mach–Zehnder Interferometer in SOI Technology", IEEE Photonics Technology Letters, vol. 12, No. 6, Jun. 2000.

4) G.V. Treyz, "Silicon Mach–Zehnder Waveguide Interferometers Operating at 1–3 $\mu$m", IBM Research T.J. Watson Research Center, Yorktown Heights NY.

5) Baojun Li et al. "Sige Mach–Zehnder Interferometer Modulator based on the Plasma dispersion Effect" Applied Physics Letters, vol. 74, No. 15, Apr. 12, 1999.

6) R.A. Soref, "Silicon Waveguides with buried–$CoSi_2$ Cladding Layers", Optics Letters, Sep. 1, 1994, vol. 19, No. 17.

7) Richard A. Soref, "Silicon Antiresonant Reflecting Optical Waveguides" Optics Letters, Jul. 15, 1990, vol. 15, No. 14.

8) Cheng T. Wang, "Introduction to Semiconductor Technology: GaAs and Related compounds" 10.7 Novel Devices A Wiley–Interscience Publication, 1990.

9) Koichi Wakita, "Semiconductor Optical Modulators" NTT Opto–Electronics Labaratories, 1998.

10) R.D. Lareau et al. "Waveguided Electro–Optical Intensity Modulation in a $SIGE_xSi_1-x$/Si Heterojunction Bipolar Transistor" IEEE Electronics Letters, Sep. 27, 1990, vol. 26, No. 20.

11) Giovanni Breglio et al. "Two Silicon Optical Modulators Realizable With a fully Compatible Bipolar Process" IEEE Journal of Selected Topics in Quantum Electronics, vol. 4, No. 6, Nov./Dec. 1998.

12) C.E. PNG et al. "Coupling to 1 $\mu$m Silicon Modulators" Proceedings of SPIE, vol. 46 54 (2002), Jan. 23–24, 2002, San Jose CA.

13) Antonello Cutolo, "Silicon Electro–Optic Modulator Based on a Three Terminal device Integrated in a Low–Loss Single Mode SOI Waveguide", Journal of Lightwave Technology, vol. 15, No. 3, Mar. 1997.

14) G.V. Treyz, "Silicon Mach–Zehnder Waveguide Interferometers based on the plasma dispersion effect", Appl. Physics Lett. 59 (7), Aug. 12, 1991.

15) P. Dainesi et al. "Intensity Modulation in Two Mach–Zehnder Interferometers using Plasma Dispersion in silicon–on–insulator", Appl. Physics B73, 475–478 (2001).

16) Carlos Angulo Barrios "Low–Power–Consumption Short–Length and High–Modulation–Depth Silicon Electrooptic Modulator" Journal of Lightwave Technology, vol. 21, No. 4, Apr. 2003.

* cited by examiner

FIG. 11
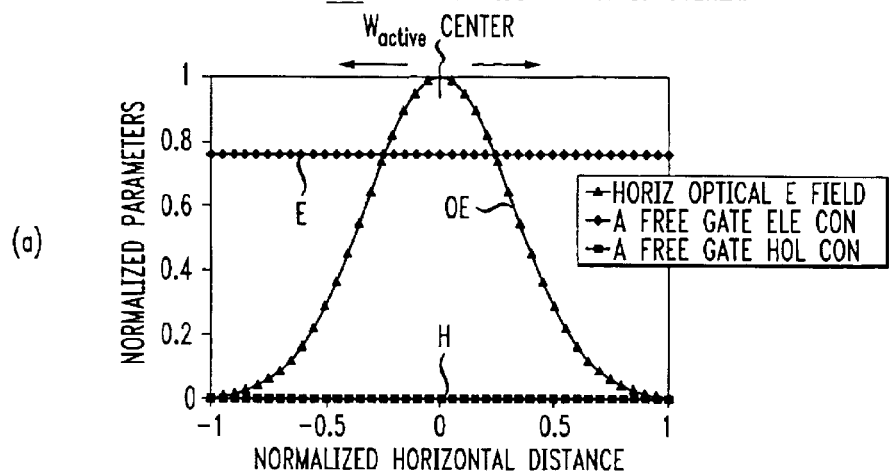
(a) HORIZONTAL GATE ACCUMULATION ELECTRO-OPTIC OVERLAP
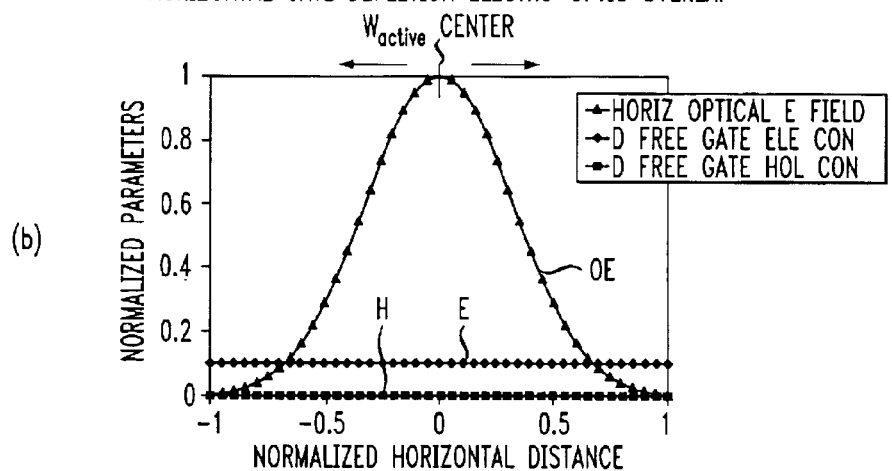
(b) HORIZONTAL GATE DEPLETION ELECTRO-OPTIC OVERLAP
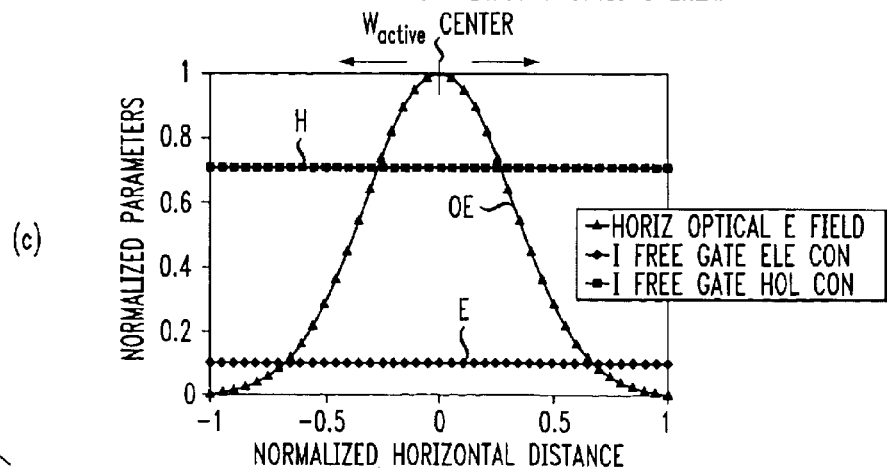
(c) HORIZONTAL GATE INVERSION ELECTRO-OPTIC OVERLAP FIG. 12
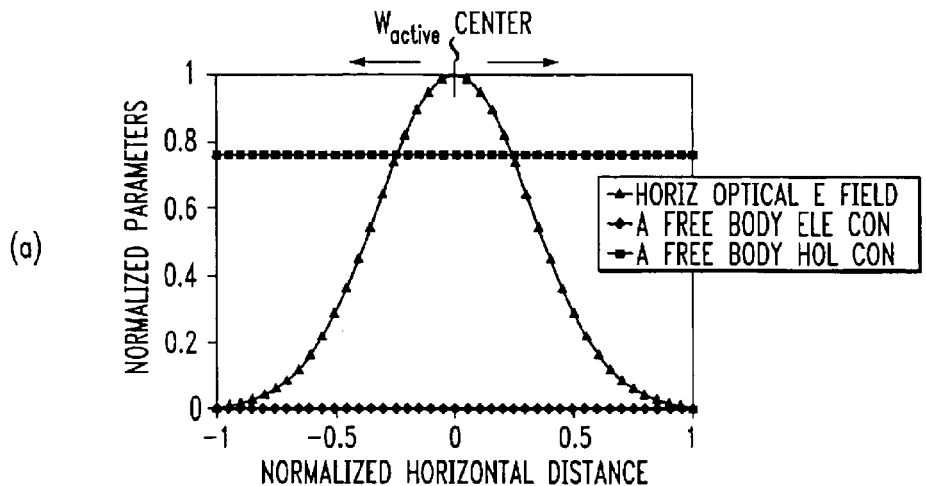
(a)
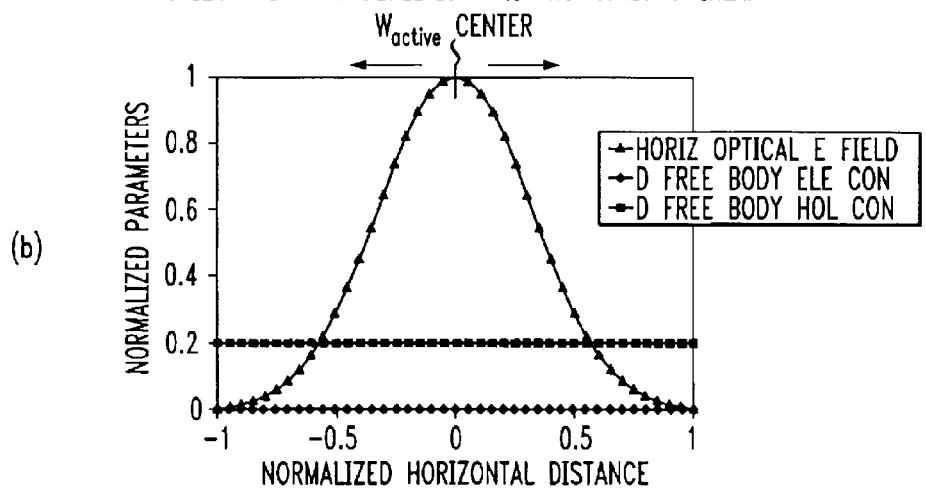
(b)
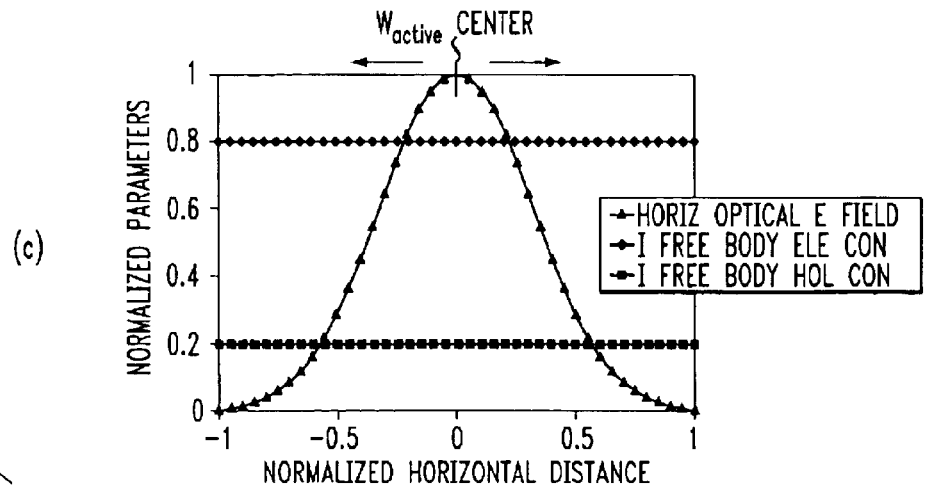
(c)

PARALLEL ARRAY EXAMPLE

SERIAL ARRAY EXAMPLE

HIGH-SPEED SILICON-BASED ELECTRO-OPTIC MODULATOR

CROSS-REFERENCE TO RELATED APPLICATION

This application claims the benefit of Provisional Application No. 60/457,242, filed Mar. 25, 2003.

TECHNICAL FIELD

The present invention relates to a silicon-based electro-optic modulator and, more particularly, to an electro-optic modulator based on SOI technology and utilizing a Silicon-Insulator-Silicon CAPacitor (SISCAP) guide geometry to provide efficient, high-speed operation.

BACKGROUND OF THE INVENTION

Silicon-based photonic components working at 1330 and 1500 nm fiber-optic communication wavelengths for various systems such as fiber-to-the-home and local area networks (LANs) are a subject of intensive research as a result of the possibility of integrating optical elements and advanced electronics together on a silicon substrate using the well-known techniques of CMOS technology.

Passive silicon structures, such as waveguides, couplers and filters have been extensively studied. Less work has been reported on active silicon devices (i.e., tunable devices), such as modulators and switches, despite their importance as a means of manipulating light beams for such communication systems. Some silicon-based thermo-optic active devices have been designed, where the refractive index of the silicon is modulated by varying the silicon temperature, thereby inducing a phase modulation and absorption which in turn is used to produce an intensity modulation at the output of the device. Nevertheless, the thermo-optic effect is rather slow and can only be used for device speeds up to 1 Mb/s modulation frequency. Therefore, for higher modulation frequencies (which are of more interest in most systems, including communication systems), electro-optic active devices are required.

Most of the proposed electro-optic devices exploit the free carrier dispersion effect to change both the real and imaginary parts of the refractive index. This exploitation is used since the unstrained pure crystalline silicon does not exhibit a linear electro-optic (Pockels) effect, and the refractive index changes due to the Franz-Keldysh effect and Kerr effect are very weak. In free carrier absorption modulators, as will be discussed in detail below, changes in the optical absorption of the structures are directly transformed into an output intensity modulation. Phase modulation in a specific region of optical devices, such as Mach-Zehnder modulators, total-internal-reflection (TIR)-based structures, cross switches, Y-switches, ring resonators and Fabry-Perot resonators, is also used to modulate the output intensity.

Free carrier concentration in electro-optic devices can be varied by injection, accumulation, depletion or inversion of carriers. Most of such devices investigated to date present some common features: they require long interaction lengths (for example, 5–10 mm) and injection current densities higher than 1 kA/cm$^3$ in order to obtain a significant modulation depth. Long interaction lengths are undesirable in order to achieve high levels of integration and miniaturization for fabricating low-cost compact device arrangements. High current densities may induce unwanted thermo-optic effects as a result of heating the structure and will, indeed, cause an opposite effect on the real refractive index change relative to that associated with free carrier movement, thus reducing its effectiveness.

FIG. 1 illustrates an exemplary prior art, silicon-based electro-optic phase modulator 1 formed using a raised rib waveguide on an SOI structure. Electro-optic phase modulator 1 includes a layer of intrinsic (single crystal) silicon 2 that has been processed to include a rib structure 3 that extends transversely (as shown in the insert) to form the optical waveguide of modulator 1, where the direction of optical signal propagation is also shown in the insert. Intrinsic silicon layer 2 is illustrated as the top layer of a conventional silicon-on-insulator (SOI) wafer structure, which further comprises a buried oxide (BOX) layer 4 and silicon substrate 5. The structure as shown forms a PIN diode modulator and is arranged to vary the refractive index in silicon rib waveguide 3 by using the free carrier dispersion effect, as mentioned above. In this particular example, silicon layer 2 is formed to include a heavily-doped p-type region 6 in contact with a first electrical contact 7. Layer 2 further includes, as shown, a heavily-doped n-type region 8 and associated second electrical contact 9. In one example, regions 6 and 8 may be doped to exhibit a dopant concentration on the order of $10^{20}$ carriers per cm$^3$. In this PIN structure, p-type region 6 and n-type region 8 are spaced apart on opposite sides of rib 3 so that intrinsic silicon lies between the heavily doped regions both in rib 3 and silicon layer 2.

In operation, first and second electrical contacts are connected to a voltage supply so as to forward bias the diode and thereby inject free carriers into waveguide 3. The increase in free carriers changes the refractive index of the silicon (as discussed using the Drude model, below) and can therefore be used to achieve phase modulation of light transmitted through the waveguide. However, to act as an optical modulator, the speed of operation of electro-optic modulator 1 is limited by the lifetime of free carriers in rib 3, as well as the carrier diffusion rates when the forward bias is removed. Such prior art PIN diode phase modulators typically have a speed of operation in the range of 10–50 Mb/s for forward biased operation. By introducing impurities into the silicon, which act as carrier lifetime "killers", the switching speed can be increased, but the introduced impurities detrimentally affect the optical transmission. However, the primary impact on speed is due to the RC time constant product, where the capacitance (C) in forward bias becomes very large due to the reduction in the depletion layer width of the PN junction in forward bias. Theoretically, high speed operation of a PN junction could be achieved in reverse bias, although this would require large drive voltages and long device lengths, which are incompatible with the CMOS process.

There remains, therefore, an urgent need for optical modulator structures based on the electro-optic effect that can be implemented in a sub-micron region while offering low cost, low current density, low power consumption, high modulation depth, low voltage requirements and high speed modulation.

SUMMARY OF THE INVENTION

The need remaining in the prior art is addressed by the present invention, which relates to a silicon-based electro-optic modulator and, more particularly, to the formation of an electro-optic modulator on an SOI wafer utilizing novel SISCAP designs with optical guide confinement geometries to provide low optical loss, high-speed operation.

In accordance with the present invention, complementary-doped silicon regions (defined hereinafter as a "body" region and "gate" region) are formed to partially overly one another with a relatively thin "gate" dielectric layer disposed therebetween (thus forming the SISCAP structure), where the area associated with the layered arrangement of a doped gate region/dielectric/doped body region then defines the location of free carrier movement into and out of each doped region during modulation. The term "relatively thin", when used in the context of describing the body and/or gate regions, is intended to define a thickness of less than one-half micron. A first doped region is formed in the thin (i.e., sub-micron) surface silicon layer of an SOI structure and conventional CMOS processing is used to form an overlying dielectric and complementary-doped silicon layer, CMOS processing being capable of providing the desired doping concentration profiles within each region. The underlying body (or surface) silicon layer may comprise a partially-depleted or fully-depleted CMOS element, strained silicon, $Si_xGe_{1-x}$, single crystal silicon or any combination thereof. The dielectric layer is formed of a material (or ultra-thin layers of more than one material) that provides for efficient transport of carriers into and out of the body and gate regions when the device is biased functioning as a barrier to carrier transport between the body and gate regions. For example, hafnium oxide, oxynitride, bismuth oxide, silicon nitride, silicon dioxide, or any multi-layer combinations of these materials may be used. The overlying silicon gate layer may comprise, for example, polysilicon; amorphous silicon; grain-size-enhanced, grain-boundary-passivated or grain-aligned silicon; strained silicon; $Si_xGe_{1-x}$, substantially single crystal or single crystal silicon, or combinations of these forms of silicon (various ones of these forms of silicon being associated with improved carrier mobility and/or reduced optical loss, as will be discussed below). Electrical connections in the form of contacts to silicide regions are then made to each of the doped gate and body regions. An optical signal to be modulated is coupled into the relatively thin (doped) surface optical waveguide layer, and an electrical modulating signal is applied to the electrical connections, resulting in phase modulation of the optical signal as it exits the waveguide layer.

It is an advantage of the present invention that the doping of the silicon layers can be controlled to provide for lightly doped regions in the active free carrier movement region and more heavily doped regions in the contact area. Thus, the series resistance is minimized while also providing lower optical loss. The series resistance can be further reduced by adding a second contact for both the gate and body regions. Moreover, the inventive SISCAP design allows for the free carrier distribution to substantially overlap with the peak (or near peak) optical electric field, accumulating, depleting or inverting carriers on each side of the gate dielectric at the same time. Advantageously, both the lateral and vertical doping profiles can be controlled by CMOS processing to provide these and other device attributes. For example, lateral doping variations in the body and gate regions can be performed by using multiple mask definitions and implants. The vertical doping profile in the gate and body regions can be controlled (in one form, graded) through a single, dynamically-controlled implant process, multiple implants of different dopant concentrations and/or implant energies, and/or a multi-layer silicon deposition, each layer having a different dopant concentration.

In accordance with the present invention, conventional CMOS processing and device elements are used to form an electro-optic modulator with sub-micron dimensions. Since the modulator is based on a capacitive structure, it draws no power in a static mode (that is, no power is required to maintain a logic state), thus exhibiting a significant reduction in power consumption when compared to prior art device arrangements.

There exist various SISCAP configurations, as well as doping arrangements, polysilicon grain size enhancements and grain boundary passivation techniques that may be used to provide the sub-micron electro-optic modulator of the present invention. It is expected that the present invention will take advantage of advances made in the state-of-the-art CMOS processing field. For example, the teachings of the present invention are compatible with alternative dielectric gate materials, such as materials used for nanometer-scale CMOS devices.

BRIEF DESCRIPTION OF THE DRAWINGS

Referring now to the drawings, where like numerals represent like parts in several views:

FIG. 11 contains a normalized graph depicting the overlap between the horizontal optical electric field and free carrier concentration in the gate region for the electro-optic modulator of FIG. 8, FIGS. 11(a)–(c) illustrating the overlap in accumulation, depletion and inversion, respectively;

FIG. 12 contains a normalized graph depicting the overlap between the horizontal optical electric field and free carrier concentration in the body region for the electro-optic modulator of FIG. 8, FIGS. 12(a)–(c) illustrating the overlap in accumulation, depletion and inversion, respectively;

DETAILED DESCRIPTION

Prior to describing specific exemplary structures of a silicon-based electro-optic device of the present invention, the following discussion will outline the modulation mechanism in silicon upon which the operation of the present invention is based. It is to be understood that while various ones of the illustrated embodiments are associated with a modulator structure, the SISCAP-based geometry of the present invention may be utilized with any silicon-based device exploiting the electro-optic effect (carrier movement) as described below.

As mentioned above, since pure electro-optic effects are not present in silicon, or are very weak, only free carrier dispersion and thermo-optic effect provide potential mechanisms for modulation. For the speeds of current interest (Gb/s and above), only free carrier dispersion is effective and, therefore, the arrangement of the present invention is based on free carrier dispersion which is described, in a first order approximation, by the following relations associated with the classical Drude model:

$$\Delta n = -\frac{e^2\lambda^2}{8\pi^2 c^2 \varepsilon_o n}\left(\frac{\Delta N_e}{m_e} + \frac{\Delta N_h}{m_h}\right), \text{ and}$$

$$\Delta k = \frac{e^3\lambda^3}{16\pi^3 c^3 \varepsilon_o n}\left(\frac{\Delta N_e}{m_e^2 \mu_e} + \frac{\Delta N_h}{m_h^2 \mu_h}\right)$$

where $\Delta n$ and $\Delta k$ define the change in the real refractive index and change in imaginary refractive index, respectively, e is the electron charge, $\lambda$ is the optical wavelength, $\varepsilon_o$ is the permittivity of free space, n is the refractive index of intrinsic silicon, m is the effective mass, $\mu$ is the free carrier mobility, and $\Delta N$ is the free carrier concentration variation. The subscripts e and h refer to the contributions by electrons and holes, respectively. Experimental evaluations of the electro-optic effect in silicon have been carried out, where it has been found that the refractive index changes as a function of free electron and hole concentrations, for the wavelengths of interest in most optic communication systems (1330 and 1550 nm) are in good agreement with the Drude model. For the purposes of understanding the operation of devices such as an electro-optic modulator, these values for change in the refractive indices are then analyzed in terms of the change in free carrier-induced phase shift ($\Delta\phi$) and absorption coefficient ($\Delta\alpha$), which are defined as follows:

$$\Delta\phi = \left(\frac{2\pi\Delta n L}{\lambda}\right), \text{ and}$$

$$\Delta\alpha = \left(\frac{4\pi\Delta k}{\lambda}\right),$$

where L is the active length along the optical propagation direction of the electro-optic modulator. For the purposes of the present discussion, the phase shift is the larger effect, and the electro-optic modulator as discussed hereinbelow can be essentially characterized as a phase modulator.

Figure 1:
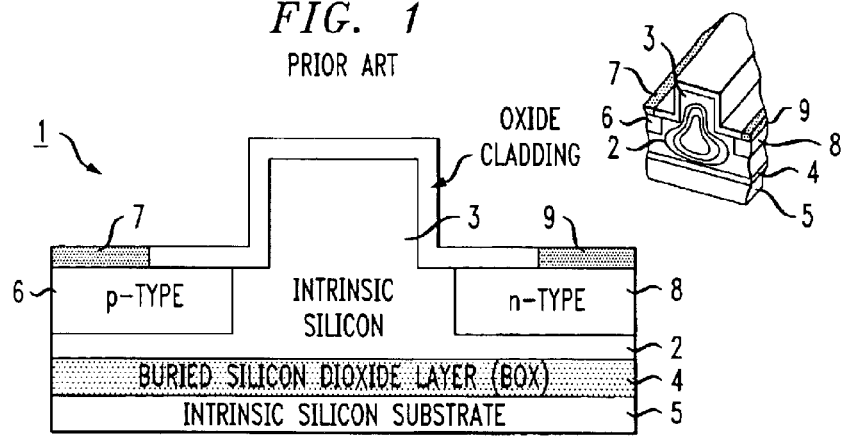
FIG. 1 illustrates an exemplary prior art silicon-based electro-optic phase modulator.

As will be described hereinbelow in association with the accompanying drawings, silicon-on-insulator (SOI) materials and technology are used in accordance with the Silicon-Insulator-Silicon CAPacitor (SISCAP) structure of the present invention to realize a free carrier-based electro-optic phase modulation device. Indeed, the inventive device is created using a SISCAP design that is compatible with the layer thicknesses of various SOI CMOS processes currently in use. In contrast to the relatively large devices that have been realized in the prior art, such as the prior art PIN structure of FIG. 1, the size of the inventive modulator device is reduced by utilizing the unique SISCAP structure, which results in increasing the overlap between the optical electric field and modulated carrier concentrations within the optical guide. Indeed, by using the inventive SISCAP guide design, the optical insertion loss of the device is reduced by using an inherent effective index contrast between the guide core and cladding, thus reducing the loss associated with the device electrodes. Moreover, the SISCAP arrangement, as will be described below, enables very high speed modulation in silicon by using small device geometries, allowing the RC time constants to be consistent with the required data rate (for example, 1 Gb/s and above, approaching at least 10 Gb/s).

Referring now to the drawings, FIGS. 2–5 illustrate, in a basic form, a set of exemplary SISCAP geometries that may be utilized to form an electro-optic modulator in accordance with the present invention. It is to be understood that these various geometries are intended to be exemplary only, illustrating various features of the present invention. In its most general form, any device structure of the SISCAP form, including complementary doped silicon regions disposed on either side of a relatively thin dielectric so as to provide for simultaneous movement of free carriers (electrons and holes) into and out of each region is considered to fall within the scope of the present invention. Moreover, the details of a specific electro-optic device based on each geometry will be discussed in detail below, where these illustrations are utilized merely to familiarize the reader with the intent of the present invention. Further, various ones of the corners of the illustrated regions are "rounded", where this rounding may be used to reduce optical loss associated with edge effects. The rounding may be accomplished using CMOS corner rounding techniques as disclosed in our co-pending Provisional Application No. 60/458,501, filed Mar. 28, 2003.

Figure 2:
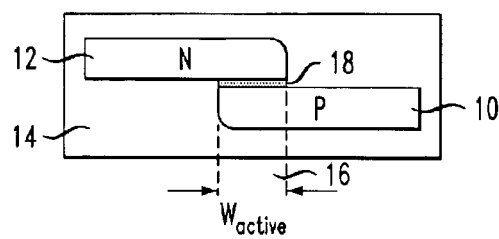
FIGS. 2–5 illustrate, in basic form, various overlap geometries that may be used to form an electro-optic modulator in accordance with the present invention.

FIG. 2 illustrates a first exemplary structure of the present invention, that includes a single crystal silicon region 10 and, as described below, is formed from the relatively thin (sub-micron) optical waveguiding silicon surface layer of an SOI structure. Appropriate doping (in this case, p-type) is used to form a first (body) region of the modulating device in layer 10. Body region 10 may comprise, for example, a partially-depleted or fully-depleted structure, strained silicon, $Si_xGe_{1-x}$, substantially single crystal silicon, single crystal silicon, or any multi-layer combination of one or more of these forms of silicon. In accordance with the present invention, an oppositely-doped (in this case, n-type) relatively thin (e.g., sub-micron) silicon region 12 is disposed so as to overly a portion of single crystal silicon region 10, this area being considered as the "active" device region and defined by reference numeral 16 in FIGS. 2–5. Silicon region 12 may comprise any suitable form of silicon, such as: polysilicon, amorphous silicon, strained-layer silicon, grain-size-enhanced silicon, grain-boundary-passivated silicon, grain-aligned silicon, $Si_xGe_{1-x}$, substantially single crystal silicon, single crystal silicon, or any combination thereof. In some cases, polysilicon may be preferred from a device performance point of view in that it exhibits a higher electron/hole mobility and lower optical loss than amorphous silicon. On the other hand, amorphous silicon may be preferred from a processing point of view in that it will yield a more uniform and planar surface than a polysilicon deposition. Silicon implantation into amorphous silicon followed by an anneal will enhance the grain size of the amorphous film. Further improvements to grain size may be achieved by using a seed catalyst, which will cause the grain size to approach a single crystal configuration. In fact, several seed techniques exist, including epitaxial lateral overgrowth (ELO) and metal-induced-lateral-crystallization (MILC). ELO, in fact, achieves single crystal structure, with the capability of forming multiple single crystal silicon layers with a gate oxide between each single crystal layer. The ELO technique is performed at temperatures of about 970° C., which may be too high for some applications. The MILC technique can be used to form polysilicon grains on the order of several tens of microns in both length and width. The MILC technique uses an opening formed through a dielectric covering on an amorphous silicon layer to start, or "seed", the process. A metal such as nickel is then deposited over the seed window and lateral crystallization is performed by subsequently annealing at a temperature of about 560° C. for 20 hours in a nitrogen ambient. The crystallization rate for the MILC process is about 4.3 μm/hour. An additional anneal may be performed after removal of the nickel seed area to further enhance the grain size, if desired. Ultimately, the use of polysilicon vs. amorphous silicon vs. any other of the above-mentioned forms of silicon is considered to be a design choice and any may be selected for the purposes of the present invention. As a matter of convenience, the following discussion may at times refer to the gate region as a "polysilicon gate", where this is to be understood as exemplary only and should not be considered as limiting the scope of the present invention.

Referring back to FIG. 2, a dielectric area 14 is disposed to surround regions 10 and 12, with a "gate" dielectric 18 formed in active device region 16 between silicon regions 10 and 12. Surrounding dielectric area 14, as discussed below, serves as a waveguide cladding region, exhibiting a lower effective refractive index than the active region, surrounding dielectric region 14 disposed such that the effective refractive index decreases away from the active region to provide substantial vertical and horizontal optical signal confinement within the electro-optic device. Relatively thin gate dielectric 18 comprises the dielectric material disposed between the body and gate "plates" of the capacitive structure of the present invention. Dielectric 18, therefore, should comprise a material that allows for relatively fast charging/discharging of the structure for high speed performance. Materials such as hafnium oxide, oxynitride, bismuth oxide, silicon nitride, silicon oxide, and combinations of these materials may be used. For the sake of clarity, only gate dielectric 18 is shaded in the illustration of FIG. 2 (and following FIGS. 3–5).

As will be discussed below, gap portion 18 can be thought of as a "gate dielectric" region used to facilitate the movement of free carriers in active region 16 into and out of p-doped body 10 and n-doped gate 12 in accordance with the modulation properties of the inventive SISCAP structure. Importantly, the well-known elements of CMOS technology processing allow for both the width of active region 16 (defined as $W_{active}$) and the thickness of gate dielectric region 18 (defined as $t_{ox}$) to be well-controlled and therefore provide the high-speed switching function associated with a modulator of the present invention (e.g., switching speeds in excess of 1 Gb/s). During various points in the following discussion, region 18 may be referred to as either "gate dielectric" or "gate oxide", where it is to be understood that an "oxide" is only an exemplary form of a dielectric that may be used in the modulator device of the present invention, where alternative gate dielectric materials are known in the art and used, for example, with nanometer-scale CMOS processing.

Figure 3:
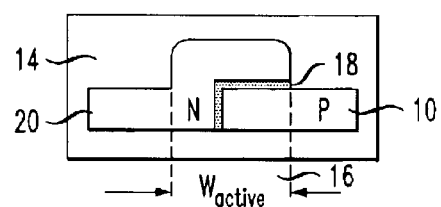
Figure 4:
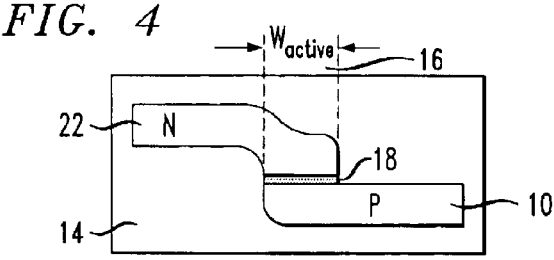
Figure 5:
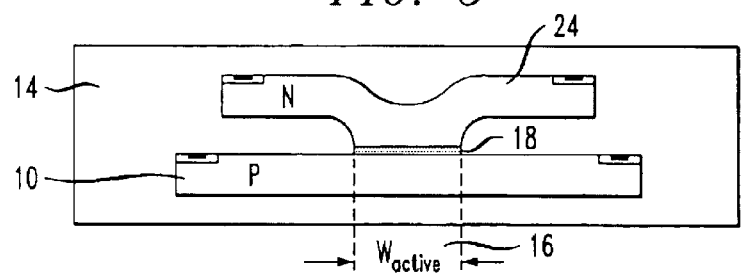

A second SISCAP geometry that may be used in accordance with the present invention is illustrated in FIG. 3. In this case, an n-doped silicon region 20 (silicon region 20 comprising any one or more of the forms of silicon discussed above) is formed so as to be coplanar with p-doped single crystal silicon layer 10, with a step extension area of region 20 disposed to cover an end portion of layer 10, thus forming active region 16 as above. In a preferred fabrication process, therefore, the upper silicon layer of an SOI wafer can be masked and doped sequentially to form both regions 10 and 20. The SISCAP geometry of FIG. 3 also includes "gate oxide" 18 disposed between the contiguous portions of layer 10 and region 20. FIG. 4 illustrates yet another SISCAP geometry that may be used in accordance with the present invention, where additional dielectric layering can be used to add additional gate and body contacts without compromising guide performance. In this case an n-doped silicon region 22 is formed above single crystal layer 10, and includes a downwardly extending end region that is used to form active region 16. Again, gate oxide 18 is illustrated as included within active region 16 between the contiguous portions of layer 10 and region 22. The arrangement of FIG. 5 is considered to be a variation of the SISCAP structure of FIG. 4, where a gate region 24 in the FIG. 5 embodiment is formed to exhibit a symmetric geometry, with the ability to utilize additional contact areas to the gate and/or body regions of the device (as shown). In each of the embodiments of FIGS. 2–5, layer 10 can be thought of as the "body" region of the modulator device and regions 12, 20, 22 or 24 can be thought of as the "gate" region of the modulator device.

Figure 6:
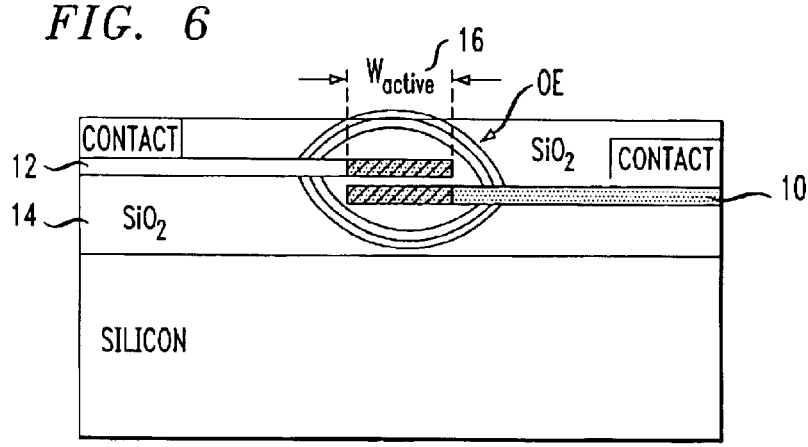
FIG. 6 contains a simplified view of an electro-optic modulator of the present invention, formed using the geometry illustrated in FIG. 2, the view of FIG. 6 illustrating in particular the location of the optical electric field within the structure.

As mentioned above, a significant aspect of the SISCAP geometry of the present invention, as well as a major advance over the prior art, is that it enables an optimum overlap of the optical field associated with the device and the free carrier movement area. FIG. 6 contains a simplified modulator arrangement formed using the geometry of FIG. 2, illustrating the optical electric field magnitude contours, as present during illumination or optical guiding in the device, these contours denoted by the reference "OE". The overlap between this optical electric field and the free carrier movement area, shown by the hashed area in FIG. 6, is evident and is considered to be much improved over prior art arrangements such as the PIN structure of FIG. 1. Indeed, the overlap of the optical electric field and free carrier movement area is substantial in each embodiment of the present invention, as illustrated in various ones of the following drawings.

Figure 7:
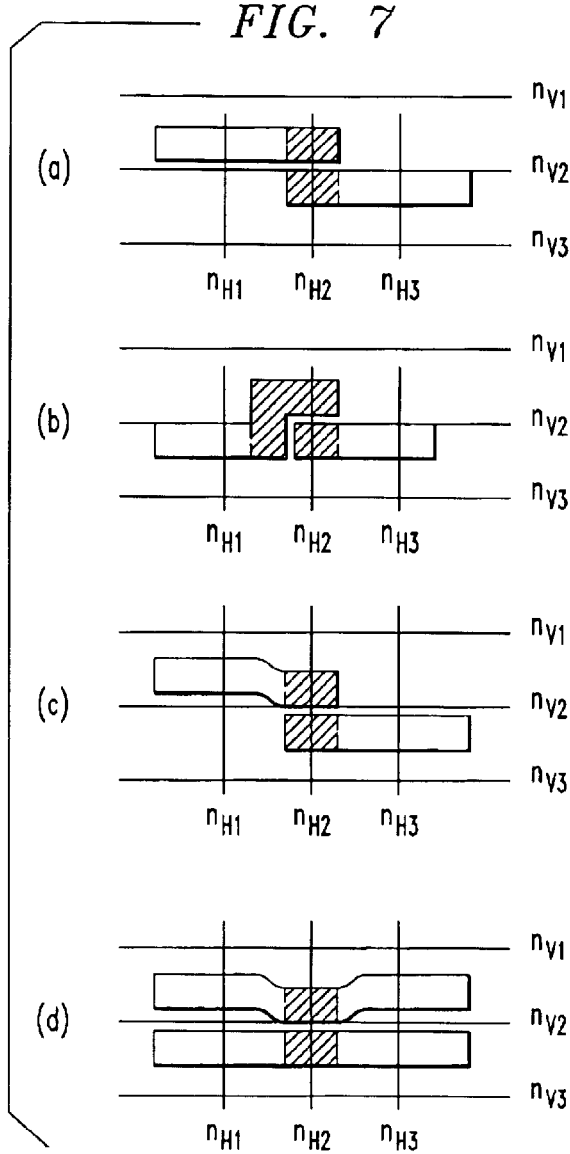
FIGS. 7(a)–(d) illustrate the optical mode/free carrier overlap areas for the geometries of FIGS. 2–5, respectively.

The graph-like diagrams in FIGS. 7(a)–(d) illustrate the optical mode/free carrier overlap areas for each of the exemplary SISCAP geometries discussed above, where the diagram of FIG. 7(a) is associated with the structure of FIG. 2, FIG. 7(b) with the structure of FIG. 3, FIG. 7(c) with the structure of FIG. 4, and FIG. 7(d) is associated with the structure of FIG. 5. As shown, each structure exhibits the same confinement area, regardless of the geometry of the particular SISCAP modulator design. Indeed, for each device, $n_{H2}>n_{H1}$, $n_{H2}>n_{H3}$, $n_{V2}>n_{V1}$, and $n_{V2}>n_{V3}$, thus providing both horizontal and vertical optical confinement. Thus, the SISCAP geometry of the present invention results in the confinement boundaries remaining consistent. Another advantage of the SISCAP structure of the present invention, as mentioned above and discussed below, is that the SISCAP structure does not consume any DC power (i.e., the device will sustain a logic "0" or a logic "1", and draw power only during a transition). The PIN junction arrangement of the prior art (such as FIG. 1) continues to draw power in its quiescent state—a problem when attempting to maintain low power consumption in an optical communication system. The continuous power draw also increases the device temperature, which reduces the desired free carrier effect.

Figure 8:
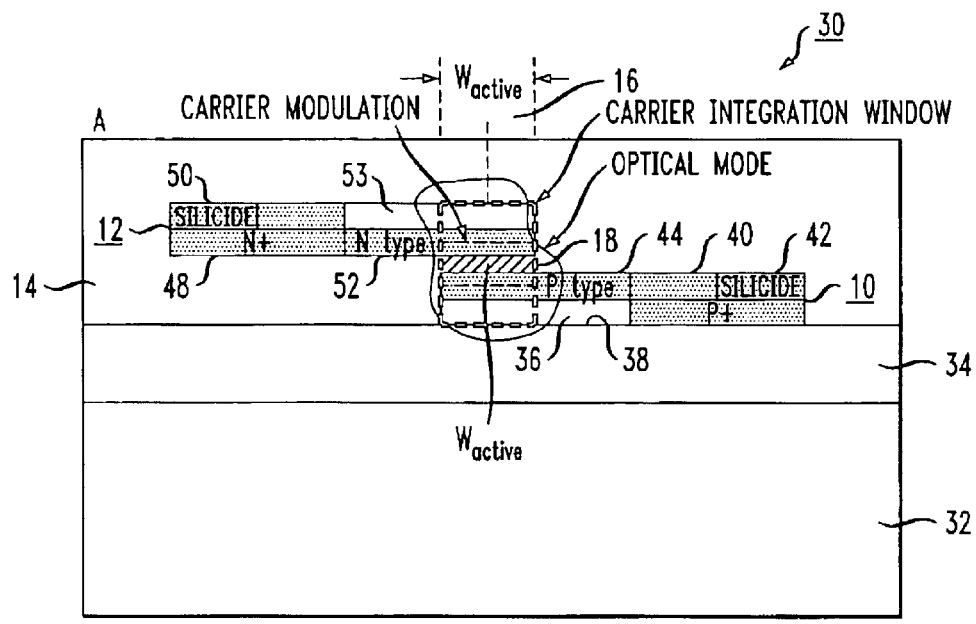
FIG. 8 illustrates a first embodiment of an electro-optic modulator formed in accordance with the present invention, the embodiment of FIG. 8 utilizing the SISCAP geometry shown in FIG. 2.

With this basic understanding of various aspects of the present invention, FIG. 8 illustrates a first embodiment of an electro-optic modulator device 30 formed in accordance with the present invention. It is to be understood that there exist various processing techniques that may be used to form the device as shown. The present invention is directed to the utilization of the unique overlap of the optical electric field and free carrier areas by virtue of the SISCAP structure exhibiting inherent, effective index guiding. Accordingly, the inventive structure may be formed using any acceptable process sequence that yields the various device elements, element positions and associated doping levels required for acceptable operation. In each case, the basis of the present invention is the utilization of an SOI wafer, incorporating the modulator elements within and above the relatively thin, sub-micron surface silicon layer to form a SISCAP structure, while also advantageously utilizing the buried oxide (or dielectric) layer of the SOI structure to maintain carrier and optical confinement. Referring to FIG. 8, the basic SOI structure of modulator 30 includes a silicon substrate 32, a buried oxide (BOX) layer 34, relatively thin sub-micron surface silicon layer 10, a gate dielectric layer 18, relatively thin polysilicon gate layer 12, and overlying dielectric 14, which combine to form a silicon optical waveguide with optical confinement in both the x and y directions by virtue of the presence of BOX layer 34 and dielectric 14. As shown in FIG. 8, layer 36 has been processed so as to be disposed along only surface portion 38 of BOX layer 34. For the purposes of the present invention, it is desired that BOX layer 34 comprise a thickness of greater than 0.2 $\mu$m, so as to reduce optical loss along the propagating signal path.

The configuration of modulator 30 of FIG. 8 is seen to reflect the particular SISCAP geometry discussed above in association with FIG. 2. Thus, reference numerals 10, 12, 14, 16 and 18 are illustrated in FIG. 8 as associated with the same device regions as discussed above. Particularly illustrated in FIG. 8 is the doping levels associated with body region 10 and gate region 12. The relatively thin sub-micron silicon surface layer 10 of the SOI structure is suitably doped in the appropriate regions to meet the operative requirements to form the body region of electro-optic modulator 30. Specifically, an end portion 40 of body region 10 is rather heavily doped (for example, approximately $10^{19}$ cm$^{-3}$ and illustrated as p+ in FIG. 8), and is subsequently processed to include a first modulator/body contact 42. Preferably, contact 42 comprises a silicide region formed by reacting a metal such as tantalum, cobalt, nickel, molybdenum, tungsten or titanium into p+ region 40. A portion 44 of body region 10, associated with the active area within which the optical mode is supported and carrier modulation occurs, is more lightly doped, on the order of $10^{17}$ cm$^{-3}$. As mentioned above, the ability to use conventional CMOS processing techniques to form both p+ portion 40 and p-type portion 44 serves to provide both a low resistance contact region (i.e., the series resistance from active region 16 to and including the silicide contact 42 and including the contact resistance) and an efficient carrier movement area for a relatively low injection current (as a result of the lightly doped portion). A remaining portion 36 of body region 10, associated with the active area within which the optical mode is supported, is even more lightly doped than p-type portion 44 so as to reduce optical loss.

In a similar fashion, relatively thin silicon gate region 12 is doped to comprise a relatively heavily doped outer portion 48 (n+ contact portion 48). As with body contact 42, a preferred form of a gate contact 50 is a silicide region formed in an appropriate area of n+ contact portion 48. An inner portion of silicon gate region 12 is then lightly doped to form n-type gate portion 52, where in accordance with the present invention, n-type gate portion 52 is positioned to overly the lightly doped p-type body portion 44 of body region 10, as separated by gate dielectric 18 (thus forming the SISCAP structure). A remaining portion 53 of gate region 12, associated with the active area within which the optical mode is supported, is even more lightly doped than n-type portion 52 to reduce optical loss. Buried oxide layer 34 and surrounding dielectric 14, exhibiting a lower refractive index than regions 10 and 12, function to provide optical confinement within the guiding structure. This positioning of the various layers then defines the carrier integration window, as illustrated by a dotted line in FIG. 8 as active region 16 of modulator 30. A significant aspect of the operation of the modulator of the present invention, and its ability to provide the 1 Gb/s and above operation with relatively smaller device lengths, is the overlap of this carrier integration window with the optical mode, as discussed above, as well as the carrier modulation area, illustrated as region A within active region 16.

Another important aspect of the present invention is the recognition that the grain size of the polysilicon used to form the gate structure needs to be understood and controlled to provide the desired carrier mobility and dopant concentration profile required for optimum performance, particularly at higher speeds approaching 10 Gb/s. For example, it may be desirous to re-crystallize the amorphous silicon after implant of the dopant to enhance the grain size, as well as the dopant distribution, within the final silicon layer. This enhancement may be required to achieve both the mobility and dopant concentrations that are considered advantageous. It should be understood that the particular process used to enhance the grain size and improve device performance is subject to a number of different variables, including an initial amorphous silicon thickness, enhancement implant species "Si", anneal conditions, etc. Additionally, silicon gate layers may be formed using crystal seed catalyst techniques to approach single crystal structures. All of these parameters are well-understood by those in the art, and can be modified to achieve the desired high speed performance in accordance with the present invention.

Figure 9:
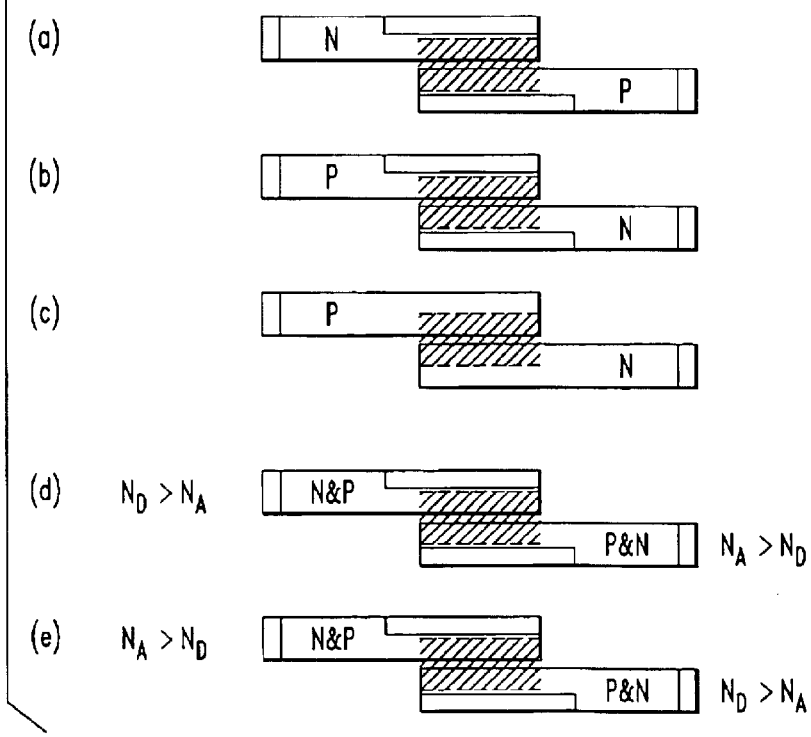
FIGS. 9(a)–(e) a number of various doping variations that may be used in the "gate" and "body" portions of the electro-optic modulator of the present invention.

It is to be further understood that the doping suggestions discussed above are exemplary only, and there exist many variations that may be utilized in the SISCAP electro-optic modulator structure of the present invention. Indeed, FIG. 9 illustrates a number of such variations. In particular, FIGS. 9(a) and (b) illustrate oppositely-doped structures for the gate and body regions (e.g., a lightly p-doped body region in FIG. 9(a) and a lightly n-doped body region in FIG. 9(b)), as discussed in detail below. An alternative embodiment, as illustrated in FIG. 9(c), will also provide the modulation function in accordance with the present invention, in this example with an n-doped silicon surface layer/body region and a p-doped gate region. As illustrated in FIGS. 9(d) and (e), a combination of n- and p-type dopants may be implanted into both body region 10 and gate region 12, as long as a difference in dopant concentration is maintained, as shown. In these embodiments, an inversion layer can be created at a lower voltage than required for the embodiments of FIGS. 9(a)–(c), requiring less time for the channel to become inverted, an advantage for devices used in inversion mode system applications. This compensated doping, however, is not advantageous for depletion mode devices that are to be operated in a fully depleted mode, since the inversion channel will reduce or limit the depletion width. In any case, each embodiment of FIGS. 9(a)–(e) may be implemented utilizing either a single polysilicon layer or a multi-layer polysilicon configuration.

Figure 10:
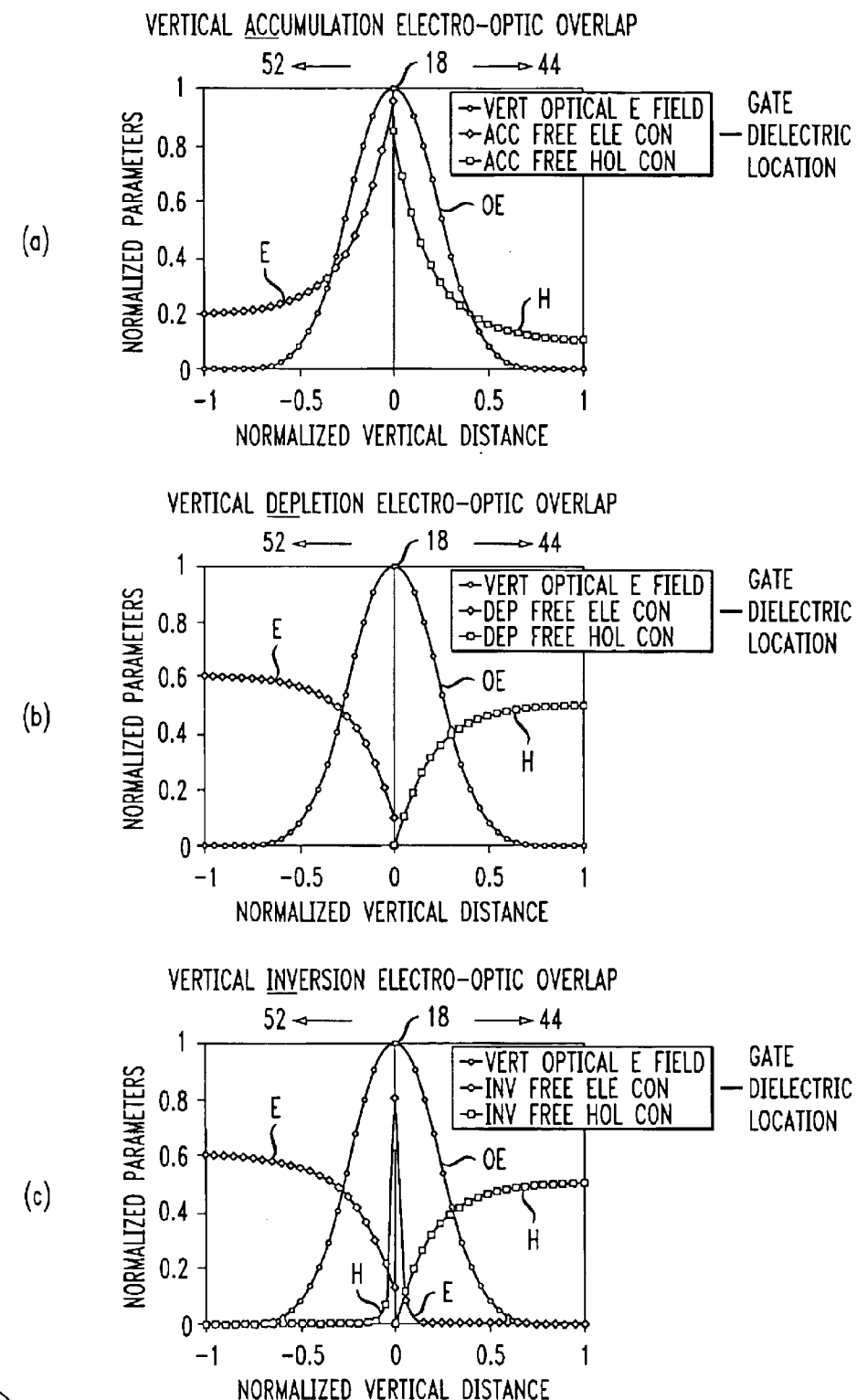
FIG. 10 contains a normalized graph depicting the overlap between the vertical optical electric field and free carrier concentration at the gate dielectric location for the electro-optic modulator of FIG. 8, FIGS. 10(a)–(c) illustrating the overlap in accumulation, depletion and inversion, respectively.

FIGS. 10, 11 and 12 illustrate, in terms of normalized parameters, the resultant overlap of the required modulator properties of the specific embodiment of the present invention shown in FIG. 8. Importantly, the overlap of the peak free carrier concentrations with the peak (or near peak) optical electric field reduces the active length (along the optical propagation direction) required to achieve a full π (180°) phase shift within the device, where in some embodiments of the present invention this reduction yields an active length of less than 2 mm. The ability to provide this overlap represents a significant advance in the state of the art for silicon electro-optic modulators. In particular, the set of plots in FIG. 10 illustrate the overlap between the vertical optical electric field, shown as plot OE in FIGS. 10(a)–(c), and the free carrier concentrations in three modes of operation. FIG. 10(a) is associated with the "accumulation" mode of operation (positive voltage applied to p-type relative to n-type), where the free hole concentration (denoted as plot H) is shown as maximum at the location of gate dielectric boundary and falls off along the extent of p-type portion 44 (indicated by the arrow at the top of the graph). Likewise, in the accumulation mode, the free electron concentration (denoted as plot E) is a maximum at the location of the gate dielectric 18 boundary and falls off along the extent of n-type portion 52. FIG. 10(b) is associated with the "depletion" mode of operation (negative voltage applied to p-type relative to n-type), with the resulting change in concentration of free carriers as shown. The inversion case (larger negative voltage applied to p-type relative to n-type than in the depletion mode of operation), is illustrated in FIG. 10(c), and illustrates the free hole carrier concentration as non-existent through n-type portion 52 until close to the boundary with dielectric 18, where a hole inversion layer forms to prevent further depletion of electrons in n-type portion 52. Similar behavior is observed with the free electron concentration in p-type portion 44.

FIGS. 11(a), (b) and (c) illustrate the overlap between the "horizontal" optical electric field (OE) and the free hole concentration (H) and free electron concentration (E) as seen in n-type portion 52. As above, plot (a) is for accumulation mode, plot (b) is for depletion mode, and plot (c) is for inversion mode operation. The center of each plot is defined as the midpoint of the $W_{active}$ region (region 16) in the horizontal direction. The carrier concentration differences in region 16 are significant, where the shift in carrier type between accumulation and inversion is clearly shown. FIGS. 12(a), (b) and (c) contain a similar set of overlap graphs as measured "horizontally" along a segment of p-type portion 44.

It is to be understood that all of the above-described differences in doping concentration and performance in accumulation, depletion or inversion mode are equally applicable to any particular SISCAP geometry that may be utilized to form an electro-optic device in accordance with the present invention, as will be apparent to those skilled in the art.

Figure 13:
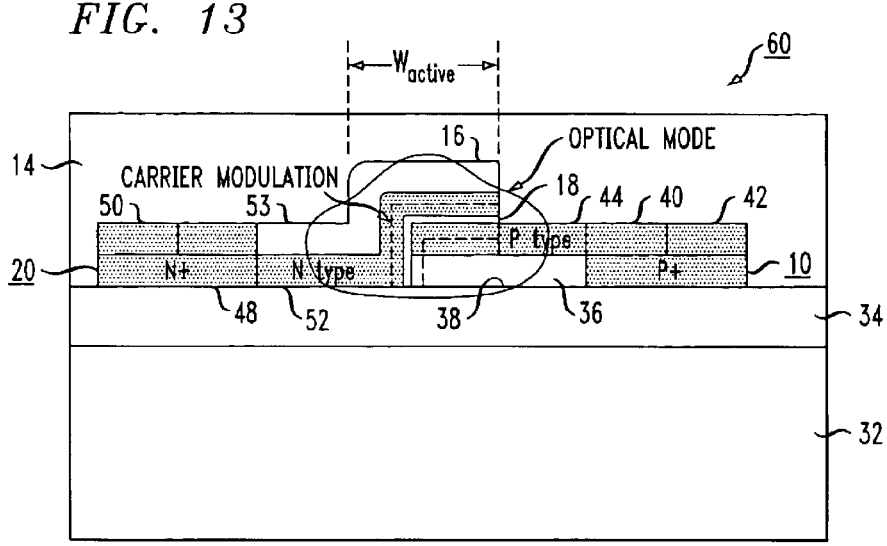
FIG. 13 illustrates a second embodiment of an electro-optic modulator formed in accordance with the present invention, the embodiment of FIG. 13 utilizing the SISCAP geometry shown in FIG. 3.

FIG. 13 illustrates a second embodiment of an electro-optic modulator formed in accordance with the present invention. Electro-optic modulator 60 as shown in FIG. 13 utilizes the gate region geometry as discussed above in association with FIG. 3. In particular, modulator 60 comprises relatively thin n-type gate region 20 and relatively thin p-type body region 10, where p-type region 10 is formed by implanting a dopant such as boron to form regions 36, 40 and 44. Region 42 is preferably a silicide, such as tantalum, cobalt, nickel, molybdenum, tungsten or titanium silicide. After appropriately etching region 10, the gate dielectric 18 is formed and region 20 is deposited in one or multiple layers using implantation of a dopant such as phosphorous, arsenic or antimony to form portions 48, 52 and 53. As with contact 42, contact 50 is also preferably formed from a silicide. Similar to modulator 30 of FIG. 8, modulator 60 of FIG. 13 includes portions 36 and 53 that are more lightly doped (or even undoped) than their corresponding p-type portion 44 and n-type portion 52, respectively, where the use of these lesser doped regions has been found to reduce optical loss. BOX layer 34 and dielectric 14, as before, provide the required optical boundaries to confine guiding with the SISCAP structure. The optical mode for this structure, as well as the active region carrier modulation area, are also shown in FIG. 13.

Figure 14:
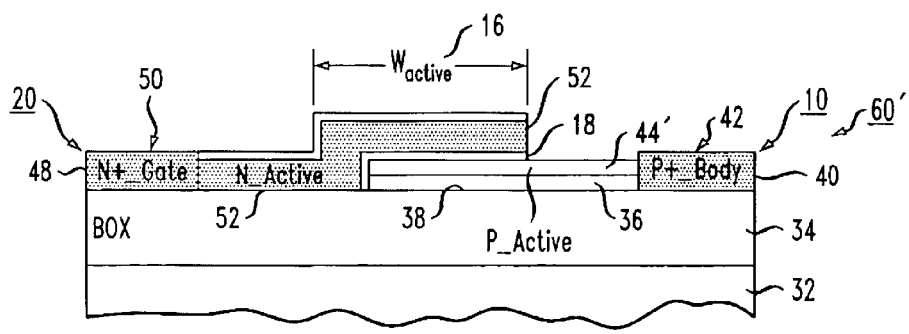
FIG. 14 illustrates a variation of the second embodiment of FIG. 13, where the variation illustrated in FIG. 14 utilizes a single polysilicon gate layer with implant doping control to form relatively thin p-type and n-type carrier confinement areas.
Figure 15:
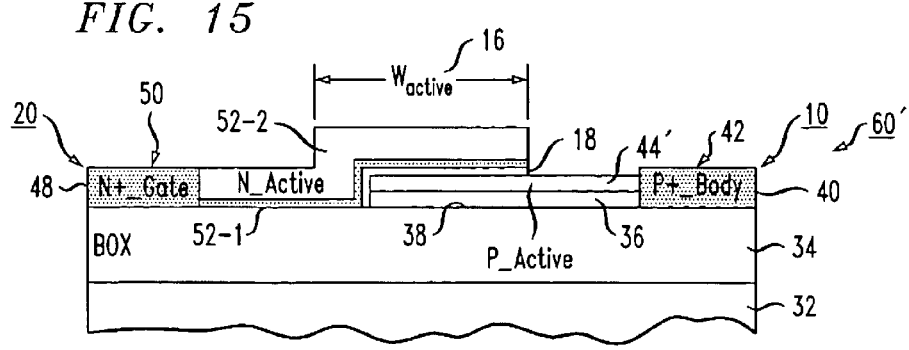
FIG. 15 illustrates another variation of the second embodiment of FIG. 13, where the variation illustrated in FIG. 15 utilizes the relatively thin p-type confinement area as shown in FIG. 14, as well as a two-layer polysilicon structure for the gate region, where the first layer is a relatively thin n-doped layer to form another thin confinement area.

FIGS. 14 and 15 illustrate variations of the specific SISCAP geometry of modulator 60 of FIG. 13, where the variations are used to control the placement and vertical confinement of dopant concentration profiles to obtain improved performance as a result of minimizing optical loss associated with the dopant characteristics. In the embodiment of FIG. 14, the doping of single crystal silicon surface layer 36 of the SOI structure is controlled to form a relatively thin p-doped carrier confinement portion 44' (compare to portion 44, above). Well-known processing techniques in terms of dopant implant energy, dose, cap layer thickness, temperature, etc. can be used to form such a thin layer for p-type confinement portion 44'. P+ portion 40, as before, is heavily doped to provide a low resistance contact to silicide 42. In the embodiment of FIG. 14, gate region 20 comprises a single polysilicon layer, with a heavily doped contact portion 48 and lightly doped n-type portion 52. FIG. 15 illustrates a variation on the embodiment of FIG. 14 where a two-step polysilicon process is used to form n-type gate portion 52. As shown, a first, relatively thin polysilicon 52-1 is deposited and doped. A lesser doped (or gradient doped) second, generally thicker polysilicon layer 52-2 is then formed to cover n-doped polysilicon layer 52-1. The two step polysilicon process enables better dopant confinement within the polysilicon layer, increases the dopant concentration near the gate dielectric interface, and reduces the amount of n-type dopant penetrating the gate dielectric and thereby doping the body region. The two step process places a higher dopant concentration near the peak optical electric field and reduces the amount of dopant outside of the carrier modulation region. This, in turn, increases the modulation magnitude and reduces the optical loss. The increased modulation magnitude can be used to reduce the drive voltage, or device optical path length, or both. Reducing the dopant penetration through the gate dielectric eliminates parasitic PN junction formation and reduces the available source of electrons for forming inversion layers in depletion mode devices.

Figure 16:
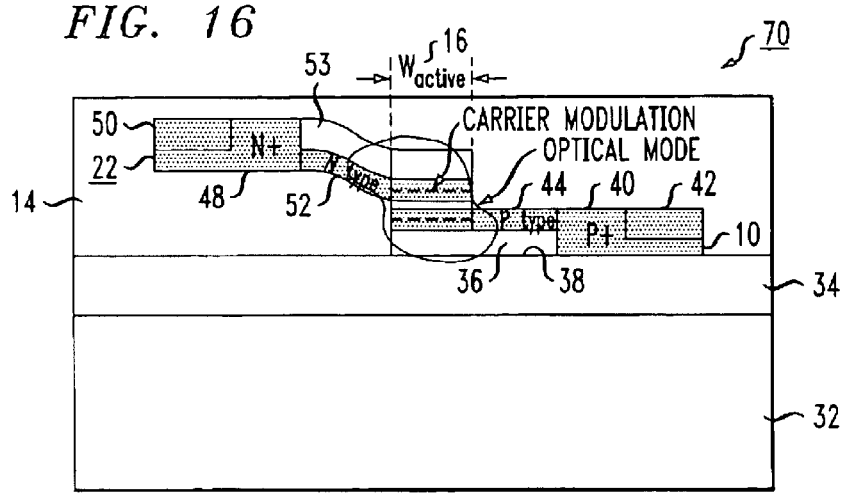
FIG. 16 illustrates a third embodiment of an electro-optic modulator formed in accordance with the present invention, the embodiment of FIG. 16 utilizing the SISCAP geometry shown in FIG. 4.
Figure 17:
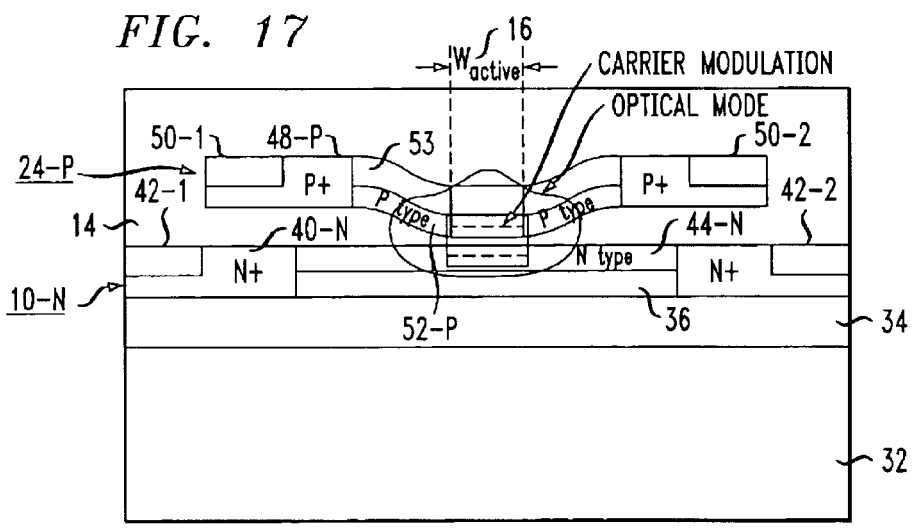
FIGS. 17 and 18 illustrate alternative arrangements of a fourth embodiment of an electro-optic modulator formed in accordance with the present invention, the embodiment of FIGS. 17 and 18 utilizing the SISCAP geometry shown in FIG. 5.
Figure 18:
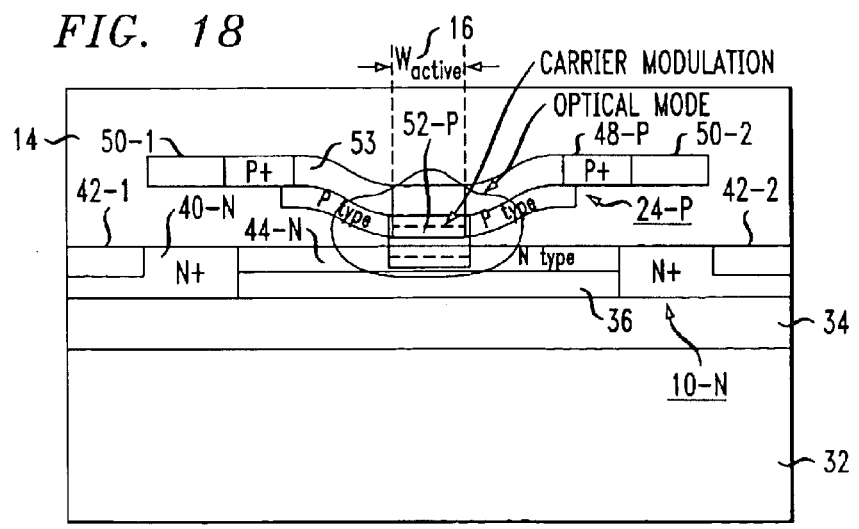

FIG. 16 illustrates an exemplary electro-optic modulator 70 of the present invention, formed using the SISCAP structure of FIG. 4, including gate region 22. The optical mode associated with this particular embodiment is as shown, where the carrier modulation area is also illustrated. A variation of this arrangement is illustrated in FIG. 17, which utilizes the SISCAP structure of FIG. 5, specifically, symmetric gate region 24. The utilization of gate structure 24 is shown to modify the optical mode to also be symmetric, similar to that illustrated in the embodiment of FIG. 13. Referring to FIG. 17, the use of symmetric gate region 24 allows for a pair of gate electrical contacts 50-1 and 50-2 to be used and disposed on either end of gate region 24. In a similar fashion, a pair of body electrical contacts 42-1 and 42-2 may be formed. As further discussed above and outlined in FIG. 9, the SISCAP structure of the present invention requires complementary silicon regions for the gate and body. In the particular embodiment as shown in FIG. 17, an n-type body region 44-N and a p-type gate 52-P are utilized. FIG. 18 illustrates a variation of the structure of FIG. 17, where gate contacts 50-1 and 50-2 are surrounded by dielectric 14, except for the adjacent contact to p+heavily doped portion 48-P. As with all of the previously-discussed embodiments, active device region 16, in the area where the carrier modulation overlaps the optical mode, both p-type portion 52-P and n-type body portion 44-N are more lightly doped. In summary, as seen by each of these embodiments, the overlap of the optical mode with the carrier modulation area is significant, and is a result of realizing the ability to use the inventive SISCAP guide arrangement of the present invention.

Figure 19:
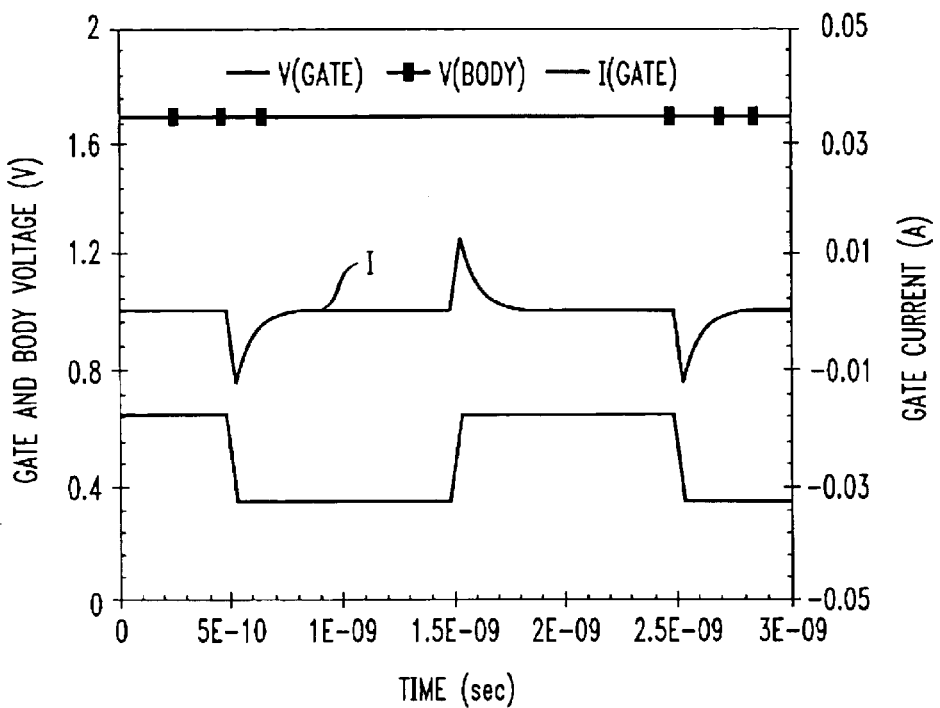
FIGS. 19 and 20 contain graphs illustrating the switching ability of the modulator structure of the present invention, FIG. 19 associated with the accumulation case and FIG. 20 associated with the depletion case.
Figure 20:
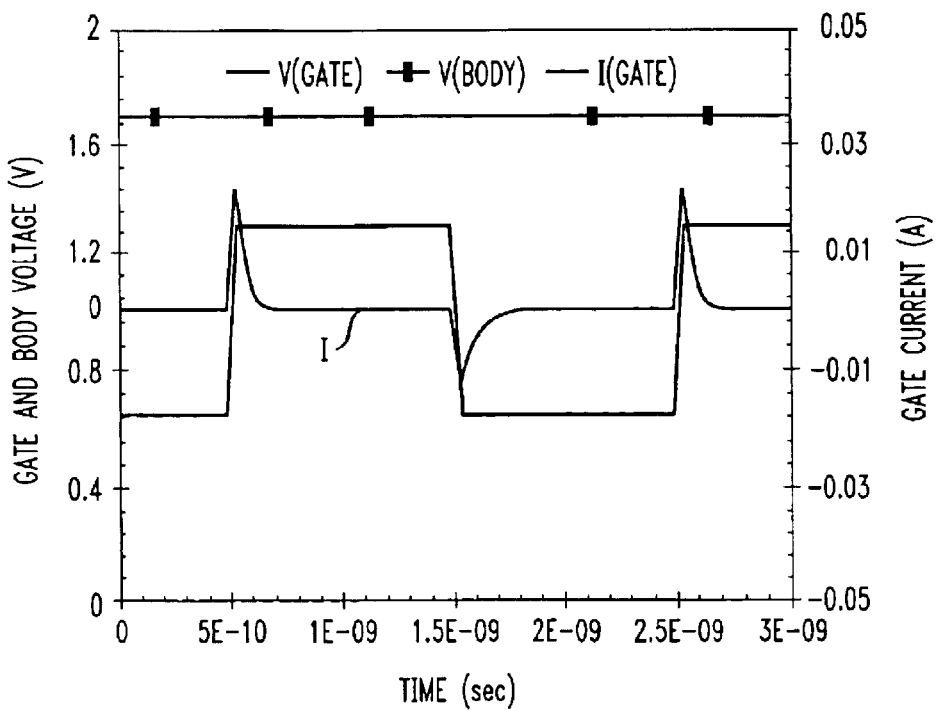

FIGS. 19 and 20 illustrate the transient terminal characteristics of an exemplary SISCAP electro-optic modulator structure of the present invention, where FIG. 19 is associated with the accumulation case and FIG. 20 is associated with the depletion case. Referring to FIG. 19, the voltage applied to body region 10 (via, for example, silicide contact 42) is held constant at approximately 1.7V. In this particular example, a gate voltage between 0.3V and 0.7V is modulated at a frequency of 1 Gb/s, providing a gate current 1 as shown as a result of free carrier movement to charge and discharge the SISCAP device. The pulse transient currents in the gate current alternate (with the gate voltage transitions) between −10 mA and +10 mA. It is to be understood that equivalent body transient currents also exist, but are not contained in these graphs for the sake of simplicity. Moreover, the gate voltages may span across the entire available power supply, if required and/or desired, and are considered to be consistent with the particular CMOS technology constraints. Indeed, other applied voltages and corresponding currents can be applied and achieved based upon the specifics of the design of the exemplary structure, where the values given above are considered as examples merely for the purposes of discussion. As described above, the SISCAP arrangement of the present invention requires substantially zero DC power, a low drive voltage, and substantially no power to hold the given optical state (as evident by the decay after each pulse current transient). The depletion case of FIG. 20 is similar, but requires a larger voltage swing on the gate contact (0.7V to 1.3V), with the pulse current transients alternating between +25 mA and −25 mA. In fact, it is clear that the settling time in depletion is significantly less, indicating even higher speed operation in depletion mode. This is a result of the SISCAP depletion capacitance being in series with the gate dielectric capacitance, thus reducing the overall design capacitance. Further, as shown in FIGS. 19 and 20, the body voltage is a fixed value. It is to be understood, however, that this could also be a time-varying applied voltage.

Figure 21:
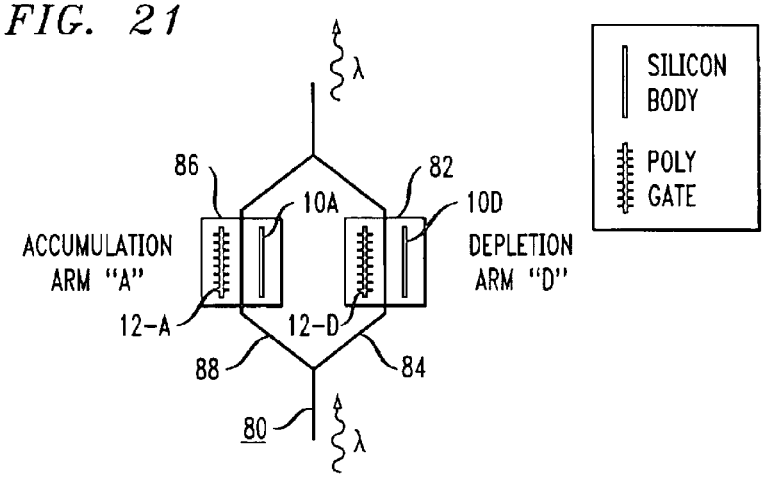
FIG. 21 illustrates, in simplified form, a top view of a Mach-Zehnder interferometer that may be formed using a pair of silicon-based electro-optic modulators formed in accordance with the present invention.

A significant advantage of the SISCAP structure of the present invention is its ability to provide an efficient electro-optic modulator in an SOI-based design, thus resulting in many different system applications. For example, a Mach-Zehnder interferometer, shown in simplified form in FIG. 21, may be formed by using well-known processing techniques to form the desired waveguiding structure 80, including an input optical signal splitter 81 and output optical signal splitter 83 within the surface silicon layer of an SOI structure. Alternatively, the MZI structure could be formed utilizing a combination of the gate region, gate dielectric and body region, with optical waveguiding supported in this combination if single crystal (or substantially single crystal) silicon gate material is used. Referring to FIG. 21, an exemplary MZI formed in accordance with the present invention utilizes a first modulator 82 disposed along a first arm 84 (denoted as the "depletion arm") of the interferometer and a second modulator 86 disposed along a second arm 88 (denoted as the accumulation arm") of the modulator. An efficient design layout of the pair of modulators 82 and 86 forms the body and gate contacts 10-A (for accumulation) and 12-D (for depletion) on the "inner" sides of the respective waveguide arms, with the gate and body contacts 12-A and 10-D on the outer sides of the respective waveguide arms. In this fashion, first modulator 82 will then function in the depletion mode (following the free carrier movement terminal characteristics discussed above in association with FIG. 20) and second modulator 86 will function in the accumulation mode (similarly following the free carrier movement terminal characteristics discussed above in association with FIG. 19). Thus, the formation of this pair of devices can form a Mach-Zehnder interferometer capable of high speed operation.

Although only a single Mach-Zehnder interferometer is illustrated in FIG. 21, it is to be understood that a significant advantage of the CMOS-based SISCAP electro-optic modulator construction of the present invention is that a plurality of such interferometers may be simultaneously formed on a single die within a wafer, where arrays of such interferometers may be connected in series, in parallel, or in any other desired configuration. Moreover, an MZI of the present invention may utilize any combination of accumulation, depletion and inversion mode devices, and may be formed as either a symmetric device (arms of equal length) or an asymmetric device (arms of unequal length). Indeed, different dopant concentrations within the modulators of each arm, or unequal splitting ratios for the input optical signal, may be used to provide for asymmetric construction for symmetric operation and increased extinction ratio (i.e., modulation depth). Further, each arm of the MZI may comprise more than one separate modulator (an asymmetric device, for example, may utilize a pair of modulators in one arm and a single modulator in the other arm), the modulators being connected in series. In one such embodiment of a multiple modulator arrangement, different electrical drive signals may be applied to separate ones of the devices. An asymmetric configuration may also be provided by utilizing an unequal split ratio of the input optical signal or unequal dopant concentrations in each arm. Any of these configurations can be used separately or in combination, and all are considered to fall within the spirit and scope of the present invention.

Figure 22:
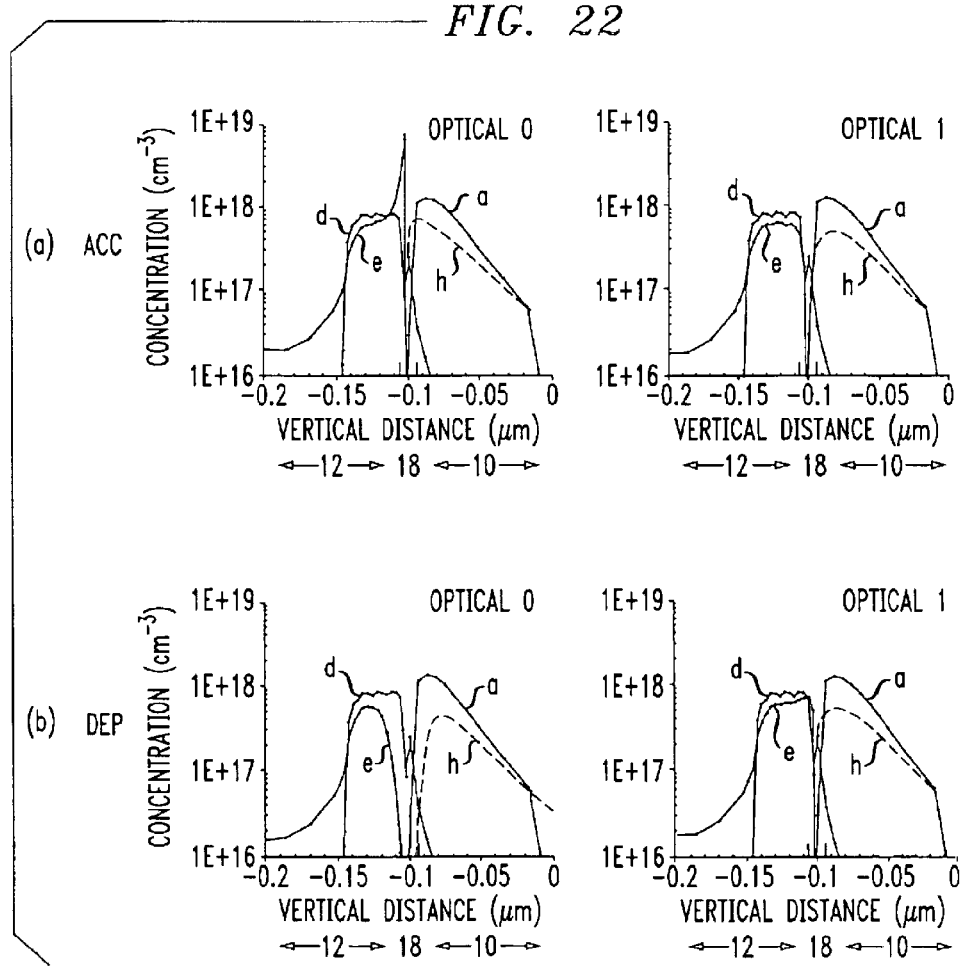
FIGS. 22(a) and (b) illustrate the optical "0" and "1" graphs associated with the accumulation and depletion arms, respectively, of the interferometer of FIG. 21.

FIG. 22 illustrates a set of exemplary optical switching characteristics for the Mach-Zehnder interferometer of FIG. 21, where the characteristics in FIG. 22(a) illustrate the "optical 0" and "optical 1" characteristics for accumulation arm 88 and FIG. 22(b) illustrates the "optical 0" and "optical 1" characteristics for depletion arm 84. Although not shown, and as will be discussed below, the AC and DC voltages applied to the electrical contacts on either arm to obtain these switching characteristics may not necessarily be equal. In each case, the donor (d), acceptor (a), electron (e) and hole(h) concentrations are shown, as measured through silicon body 10, gate dielectric 18 and gate region 12.

Figure 23:
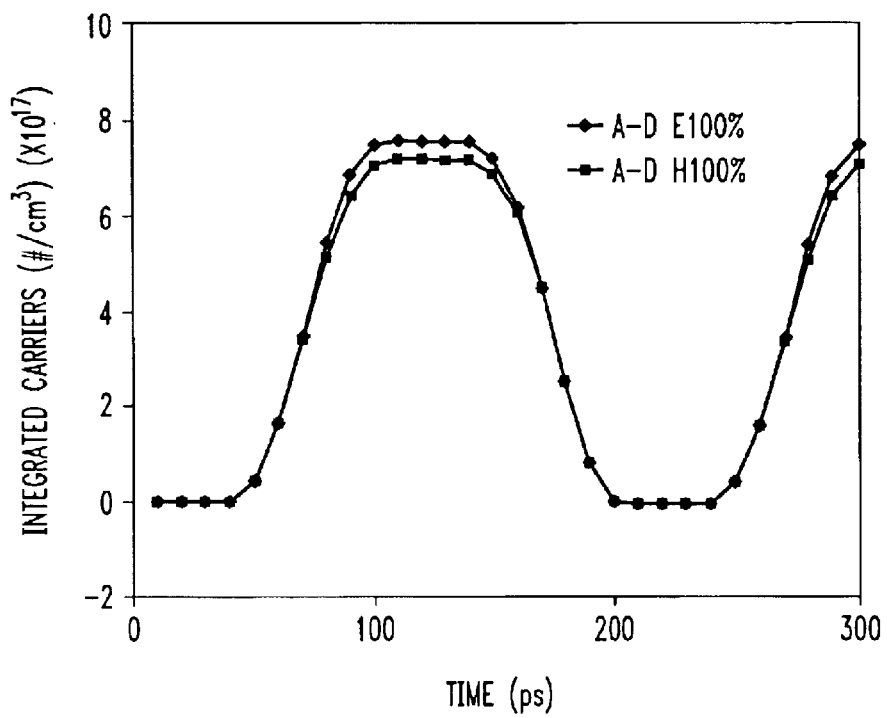
FIG. 23 is a graph illustrating the 10 Gb/s performance of the electro-optic modulator of the present invention, illustrating the difference in electron and hole concentrations.

FIG. 23 is a graph of the modulation of MZI differential electron and hole free carrier concentrations for a 10 Gb/s electrical drive signal applied to the structure of FIG. 21. The MZI differential carrier concentrations were calculated by subtracting the depletion arm ("D" concentration) from the accumulation arm ("A" concentration), denoted as A–D in the plot. Referring to FIG. 23, the legend "E" represents electrons, and "H" represents holes. The percentage shown represents the electron mobility in the gate with respect to the single crystal bulk value. The particular MZI device under study had an n-type gate and a p-type body. Of course, other configurations can be used, where the hole mobility in the polysilicon would be of primary concern. As shown, the peak hole-free carrier concentration is less than the peak electron-free carrier concentration. Accordingly, the hole concentration can be increased by increasing the p-type doping concentration near the silicon body/gate dielectric interface (for a p-type body). If the n-type doping is held constant, the hole concentration can be elevated relative to the electron concentration with this increase in p-type dopant. Changing the p-type doping in this way, the hole concentration can be made equal to or greater than the electron-free carrier concentration. Similarly, the p-type dopant concentration can be held constant while decreasing the n-type doping near the polysilicon gate/gate dielectric interface. This would reduce the peak free electron concentration of the pulse relative to the peak hole concentration. Adjustment of the doping concentrations can be achieved by changing the implant energy, or dose, or both. The capability to adjust the relative electron-hole free carrier concentrations is important since the optical phase shift or attenuation for each carrier type is different. Optical pulse performance can therefore be optimized by appropriately adjusting the relative electron and hole concentrations.

Figure 24:
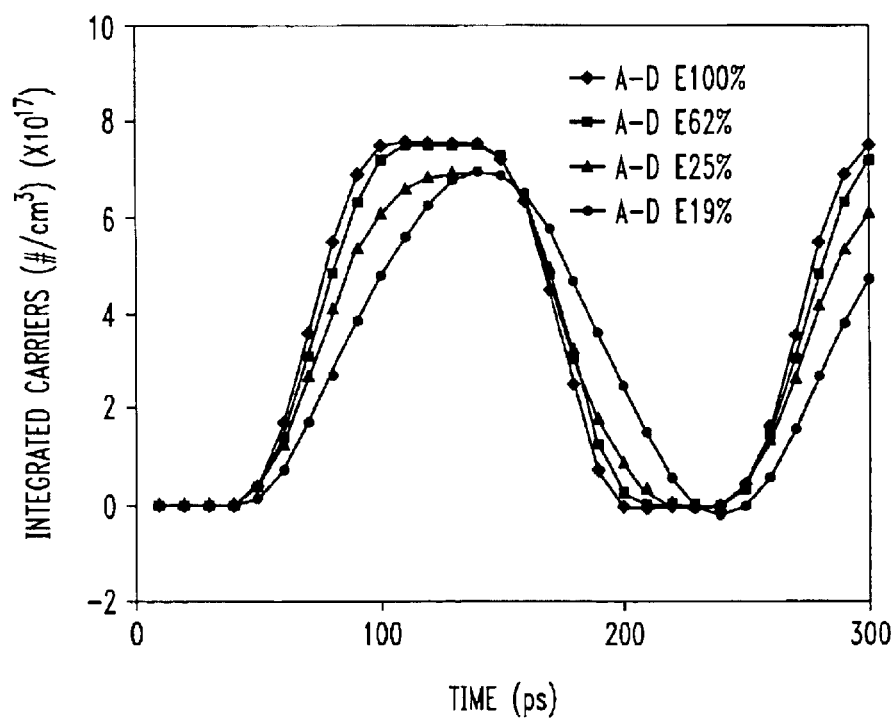
FIG. 24 is a graph illustrating the effects of carrier mobility on the performance of an electro-optic modulator of the present invention, operating at a data rate of 10 Gb/s.

Moreover, as discussed above, the physical properties of the gate silicon layer may need to be addressed to provide for the free carrier mobility required for speeds approaching 10 Gb/s. FIG. 24 contains a graph illustrating the effects of carrier mobility in the gate region on device performance at 10 Gb/s. The curves were calculated for the mobility percentages (as defined above) ranging from 19% to 100%. It is clear that device performance increases with an increase in gate silicon mobility. Therefore, techniques such as re-crystallization of the gate polysilicon layer may be used to enhance the grain size of the polysilicon and improve the mobility of the carriers. Additionally, the silicon gate region may be formed using crystal seed catalyst process techniques to increase carrier mobility to near-single crystal values. As mentioned above, Si implantation in an amorphous silicon film, followed by annealing, can also be used to enhance grain formation, thereby improving free carrier mobility. A process to passivate the grain boundaries, such as hydrogen annealing, may be used to improve the optical loss due to the remaining grain boundaries. In general, it is recognized that the ability to provide high speed operation will require careful control of the gate silicon, in concert with the dopant confinement techniques discussed above.

Figure 25:
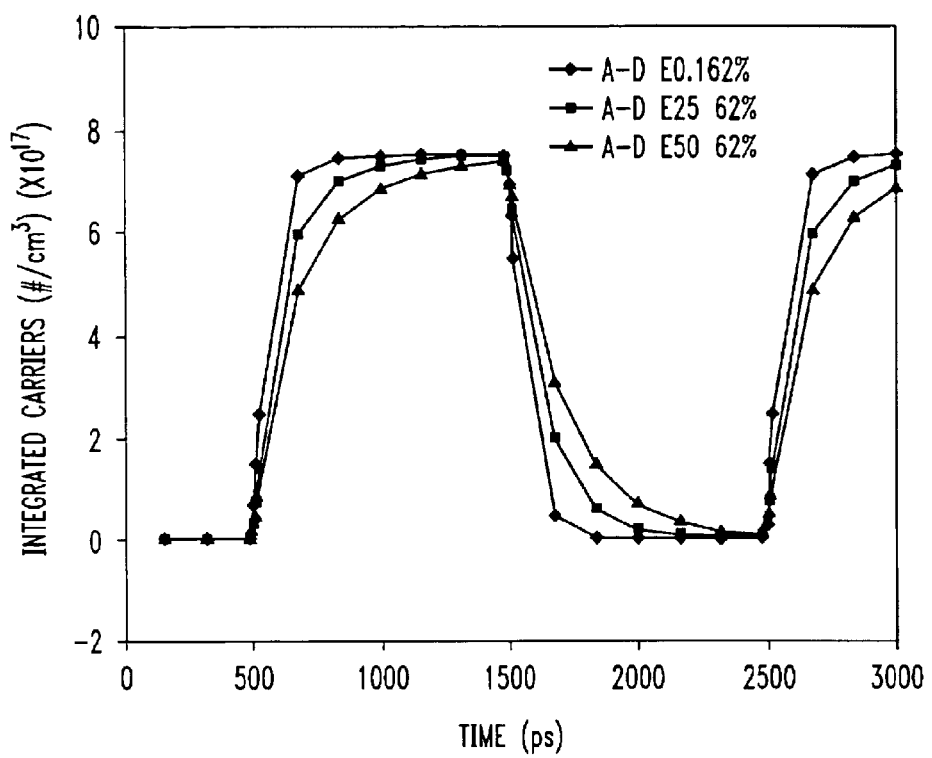
FIG. 25 is a graph illustrating the effects of input impedance on the performance of an electro-optic modulator of the present invention, operating at a data rate of 1 Gb/s.

Another concern related to the high speed performance of the SISCAP electro-optic modulator of the present invention is the driven output impedance "seen" by the modulator. FIG. 25 is a graph illustrating the effect of input impedance on 1 Gb/s operation (each curve generated with a like carrier mobility value of 62%). The three curves are associated with input impedance values of 0.1, 25 and 50 Ω, where the first impedance value is associated with an "on-chip" value that would be seen by a modulator when the input signal driver is integrated on the same platform as the modulator. The latter two values are associated with the use of an "off-chip" signal source being used to provide the input electrical drive signal to the modulator. Given the drop in peak value and increased rise/fall times for the 50 Ω source output, it is clear that various other characteristics of the SISCAP modulator as discussed above (series resistance, dopant concentration, mobility, contact layout, $W_{active}$ width, etc.) need to be considered to overcome this drop. Indeed, an advantage of the arrangement of the present invention is that CMOS circuit techniques may be used to overcome these various limitations to high speed operation. For example, on-chip drivers with very low output impedance can be used to eliminate the need to operation at 25 Ω or 50 Ω output impedance since the microwave transmission lines are eliminated between the modulator and driver. Thus, the on-chip driver can be used to transform the drive impedance from 25 Ω or 50 Ω to much lower values, for example, less than 10 Ω.

Figure 26:
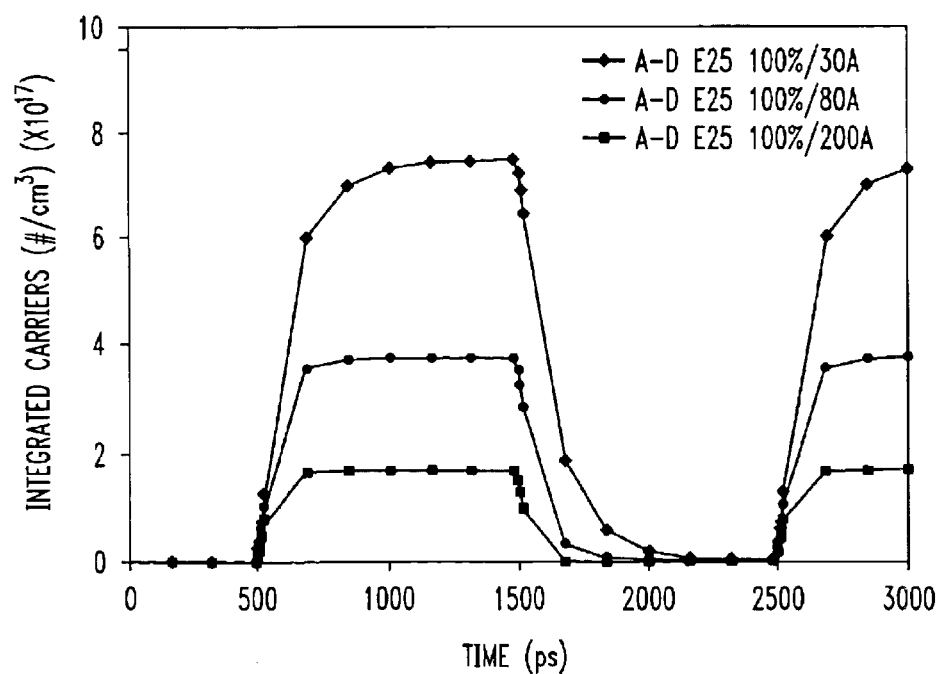
FIG. 26 is a graph illustrating the effects of gate dielectric thickness on the performance of an electro-optic modulator of the present invention, operating at a data rate of 1 Gb/s.

FIG. 26 contains a graph illustrating the effect of the thickness of the gate dielectric (referred to as "$t_{ox}$" in various ones of the figures) on the performance of an electro-optic modulator formed in accordance with the present invention. Again, the characteristic measured is the difference in carrier concentration between the "accumulation" and "depletion" arms of an exemplary MZI, with these measurements presuming an input impedance of 25 Ω and a mobility factor of 100%. The plots shown in FIG. 26 were calculated for three different gate dielectric thicknesses: 30 Å, 80 Å, and 200 Å. For the purposes of the present invention, each of these values is defined as "relatively thin" as that term is used throughout the text. As shown, the increase in gate dielectric thickness results is a significant reduction in carrier concentration, but at the same time reducing the transition time between optical "1" and "0". In concert with the various other modifications discussed above, the thickness of the gate dielectric utilized in a given situation (as well as the material used to form the dielectric, as discussed below) may be modified to suit the particular system requirements and CMOS process technology compatibility.

Figure 27:
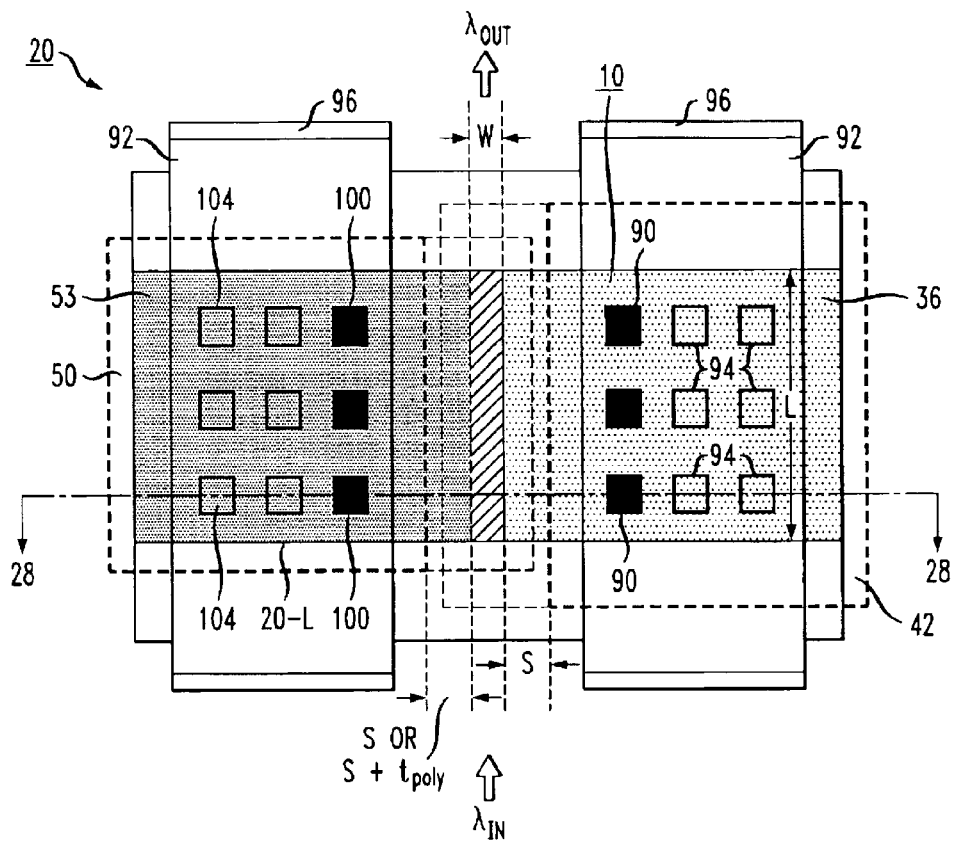
FIG. 27 is a top view of an exemplary layout arrangement for a SISCAP electro-optic modulator formed in accordance with the present invention.
Figure 28:
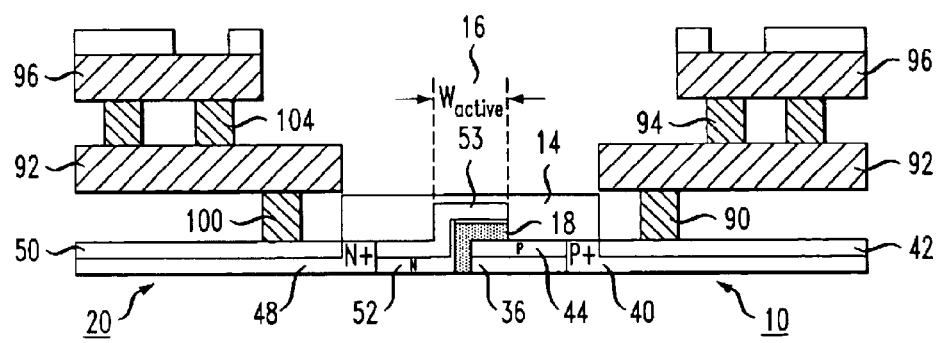
FIG. 28 is a cut-away side view of a final device structure associated with the layout of FIG. 27, taken along line 28—28 of FIG. 27.

Various layouts of the device regions required to form the SISCAP electro-optic modulator of the present invention may be employed, where a set of exemplary layouts that are considered to be efficient and result in the desired high speed operation are shown. FIG. 27 is a top view illustrating the various mask layout layer interrelationships of the regions of an exemplary structure, where a side view of the final structure, taken along line 28—28 of FIG. 27, is shown in FIG. 28. A series of metal contacts 90 (which can comprise one or more separate metallic contacts) is used to provide a connection between p-type body silicide contact 42 and a first metal layer 92 (as shown in FIG. 28). A plurality of vias 94 can then be used to provide a contact between this first metal layer 92 and an overlying metal layer 96. A similar set of contacts 100 can be used to provide a connection between n-type gate silicide contact 50 and first metal layer 92, with a set of vias 104 providing connection between first metal layer 92 and second metal layer 96. As shown, an optical signal $\lambda_{IN}$ enters at the "bottom" of the view of FIG. 27, where this signal is coupled into active area 16 (see FIG. 28). The application of an electrical modulation signal through second metal layer 96 and first metal layer 92 will result in the movement of free carriers in active region 16, as discussed above, resulting in $\lambda_{OUT}$ being phase modulated and, to a lesser extent, amplitude modulated. Advantageously, well-known CMOS processing techniques are used to form the particular layout as depicted in FIGS. 27 and 28, allowing for the various dimensions, such as S and W. Indeed, the width of active region 16 (W), is chosen knowing that a relatively small W reduces the capacitance value in the RC time constant of the SISCAP structure, while a relatively larger W is desired to reduce optical loss (i.e., a larger mode size). A similar situation exists for the parameter S, in that smaller values reduce the series device resistance, but increase the optical loss. Obviously, in each set both optical and electrical constraints cannot be met simultaneously, and a trade-off between these performance parameters are at the discretion of the particular embodiment.

Figure 29:
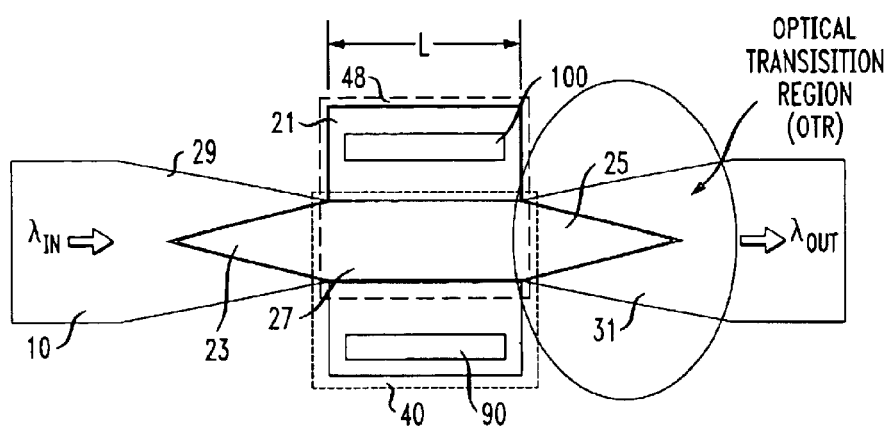
FIG. 29 is a simplified top view of an alternative layout design, utilizing a tapered polysilicon layer for improved optical coupling efficiency.
Figure 30:
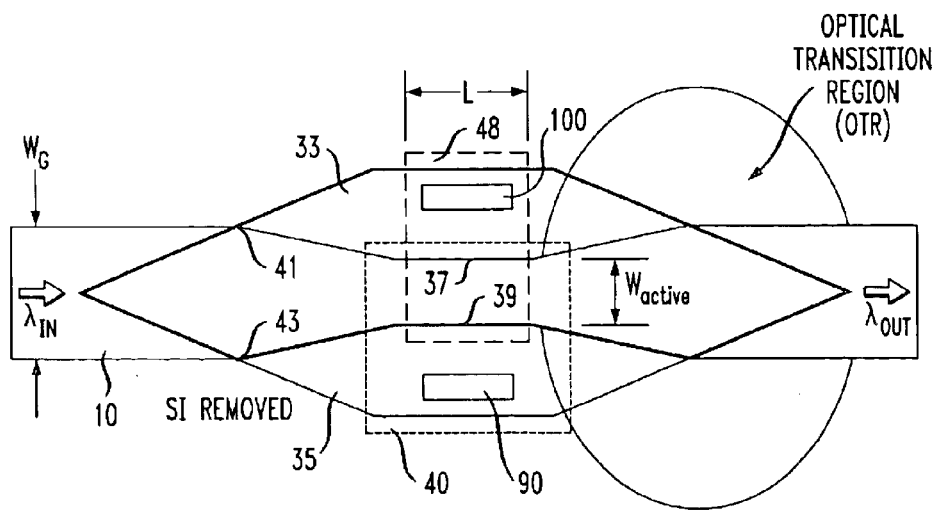
FIG. 30 is a simplified top view of yet another tapered polysilicon arrangement useful in a SISCAP electro-optic modulator of the present invention.

It has been discovered that a further advantage of using conventional CMOS processing to form the SISCAP electro-optic modulator of the present invention is the ability to tailor the topology and shape of various layers to enhance device performance. For example, and as shown in FIGS. 29 and 30, the topology and shape of the gate polysilicon layer and silicon body layer can be modified to improve optical coupling into and out of the modulator itself. Referring back to FIG. 27 discussed above, side 20-L of gate polysilicon 20 is illustrated as having an abrupt step at the location where an input optical signal propagating along body region 10 first encounters the modulator structure. Such an abrupt change in geometry results in a significant portion of the optical signal being reflected and, therefore, not coupled into the modulator structure. This problem may be overcome by using a tapered gate polysilicon layer, such as polysilicon layer 21 shown in FIG. 29, where the topology and shape of the gate polysilicon has been modified to include an input taper 23 and an output taper 25 (these tapers may be either one- or two-dimensional).

By gradually introducing the presence of the polysilicon layer over the optical waveguide, the index change within the optical transition region (shown as OTR) will also gradually increase, until the size of the polysilicon layer matches the width of active region 16. The careful control of the change in effective index seen by the incoming optical signal will significantly reduce the portion of the optical signal that is reflected at the input of the modulator. Upon exiting the device, a similar decreasing output taper will reduce the amount of optical signal reflected back into the active device region by gradually reducing the refractive index change seen by the optical output signal. An underlying tapered silicon layer 27 is utilized to provide for optical mode matching between an incoming optical signal and the cross-sectional waveguiding area within the active region. As shown, tapered silicon layer 27 includes an inwardly tapered input section 29 so that an incoming optical signal will gradually decrease in mode size as it approaches the modulator, until the mode size coincides with the active region (i.e., region 16) of the modulator. In a similar fashion, an output silicon taper 31 functions to increase the mode size at the output of the modulator so as to provide improved output coupling efficiency into an output waveguide (not shown). The OTR is essentially undoped and as such does not significantly impact the device speed.

Although illustrated in FIG. 29 as including both an input taper and output taper, it is to be understood that both the gate and silicon structures may include only one such taper and, indeed, there may be applications where only (for example) an input taper is required. Moreover, there may be applications where only the gate region is tapered, or only the silicon region is tapered.

FIG. 30 illustrates a variation of this tapered arrangement, where an exemplary gate polysilicon layer 33 is formed to provide a controlled introduction of the optical signal, eliminating any "corners" in the layout of the polysilicon layer, where these corners are known to introduce reflections into the system. Underlying silicon layer 35 is similarly formed to minimize the presence of corners, wherein in the arrangement as illustrated in FIG. 30, silicon layer 35 is patterned to angle in a direction opposite to overlying polysilicon layer 33. Therefore, as an additional advantage, this particular layout arrangement reduces the constraints on the individual layer minimum line width rules of active region 16 (defined as $W_{active}$), composed of layers 35 and 33, SOI and polysilicon, respectively. The active region in this case is defined as the distance between innermost edge 37 of silicon layer 35 and outermost edge 39 of polysilicon layer 33. Indeed, using the design of FIG. 30, an active region having a width $W_{active}$ of 0.35 μm can be formed using design rules on the order of 1.0 μm. Moreover, optical mode matching still occurs in the particular layout of FIG. 30, even without tapering underlying silicon layer 35. Indeed, the optical mode will begin to be re-sized at corners 41 and 43, as shown, with one side of the optical signal mode confined by the "upper" side of silicon layer 35 (corner 41) and the other confined by the "lower" side of polysilicon layer 33 (corner 43).

Figure 31:
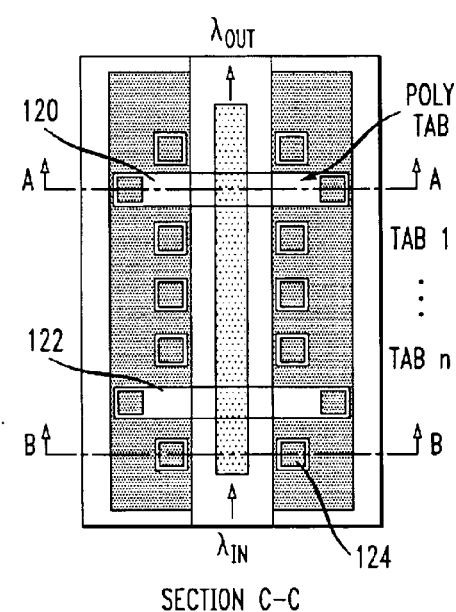
FIGS. 31 and 32 contain a top view and side views, respectively, of an alternative layout for a SISCAP modulator of the present invention, utilizing a tab geometry.
Figure 32:
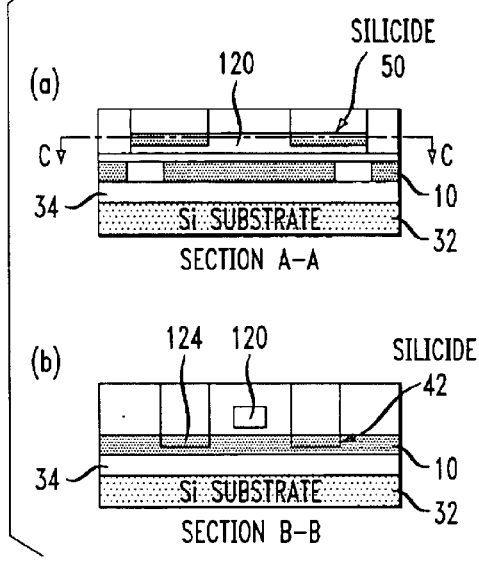
Figure 33:
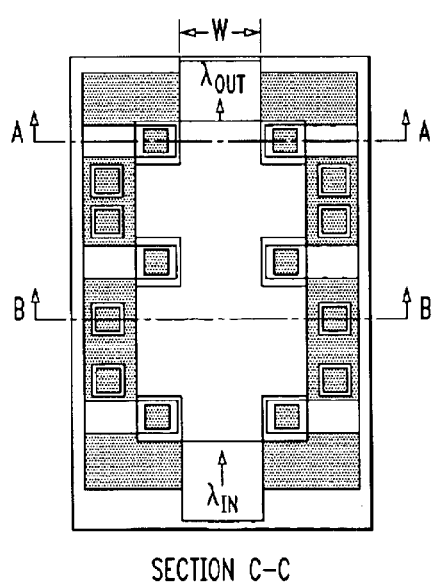
FIGS. 33 and 34 contain a top view and side views, respectively, of yet another layout for a SISCAP modulator of the present invention, utilizing a "wide gate" geometry, useful where horizontal confinement of the optical signal is not a concern.
Figure 34:
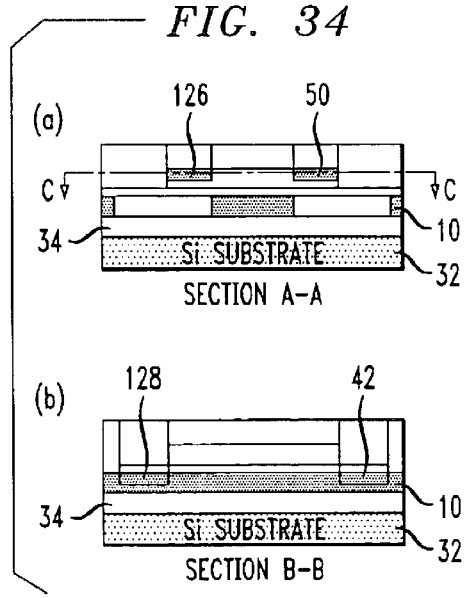

FIGS. 31 and 32 illustrate a top view, and cut-away views, respectively, of an alternative (low speed) layout arrangement. In this case, the gate polysilicon layer has been patterned to exhibit the "crossbar" structure as shown, including a pair of polysilicon tab contacts 120 and 122 which are used to provide the electrical connection between silicide 50 of gate 12 and an electrical modulating input signal. Section C—C of FIG. 32(a) illustrates this "gate" contact, showing in particular the contact between gate silicide 50 and polysilicon tab contact 120. The contact to body silicide 42 is provided by a plurality of separate metal contacts 124 as shown in the top view (FIG. 31) and the section B—B view (FIG. 32(b)). An alternative "wide gate" layout is illustrated in FIGS. 33 and 34, where this layout can be used in arrangements where the beam diameter is less than the width W of active region 16, and guiding is not required in the horizontal direction. In this case, the gate polysilicon layer has been patterned, as shown, to provide for a plurality of contacts 126 to gate silicide 50, as well as a plurality of separate contacts 128 to body silicide 42.

Figure 35:
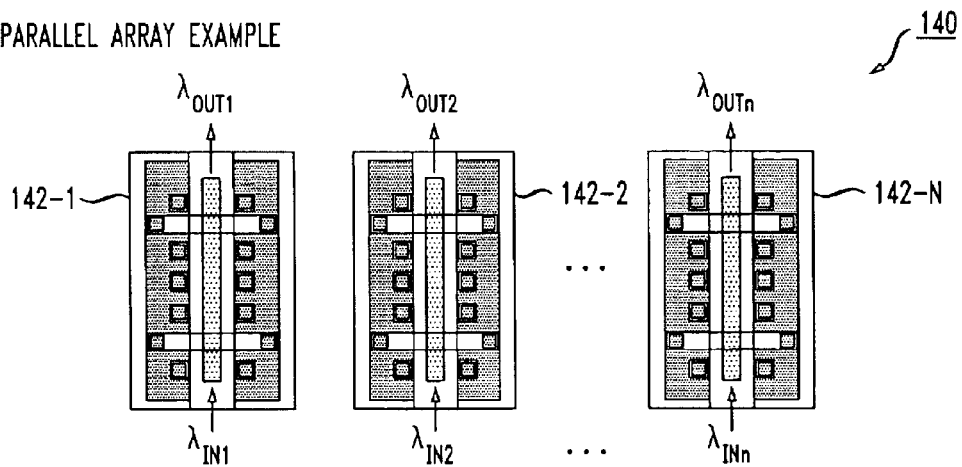
FIG. 35 illustrates an exemplary parallel array of electro-optic modulators formed in accordance with the present invention.
Figure 36:
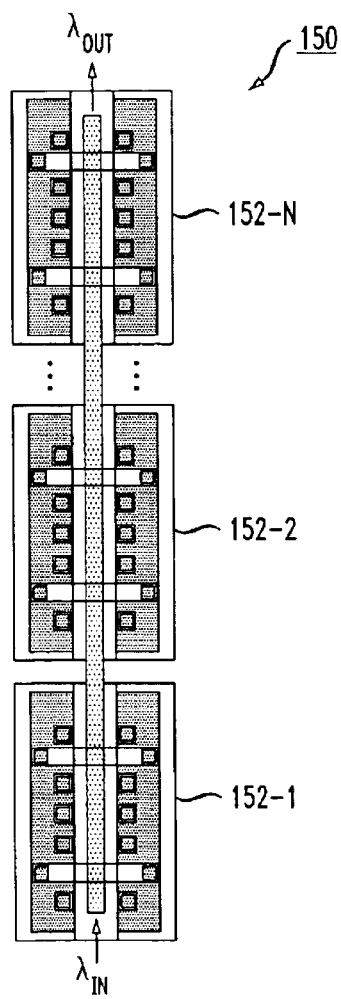
FIG. 36 illustrates an exemplary serial array of electro-optic modulators formed in accordance with the present invention.

Indeed, as a further implementation of the present invention, it should be understood that the use of relatively simple CMOS processing techniques and layouts to form the inventive SISCAP electro-optic device structure allows for various combinations of such devices to be simultaneously fabricated on a single die on a wafer, providing for arrays and other configurations to be formed with little or no difference in performance, since each device was subjected to the same processing conditions in terms of depositions, dopant diffusion characteristics, etc. FIG. 35 illustrates an exemplary parallel modulator array configuration 140 that may be formed using a plurality of SISCAP electro-optic modulators of the present invention, in this case, utilizing the tab layout of FIG. 31. Parallel array 140 comprises a set of separate modulators 142-1, 142-2, . . . , 142-N, where each modulator may receive a separate optical signal operating at a different wavelength (illustrated as $\lambda_{IN1}, \lambda_{IN2}, \ldots, \lambda_{INn}$) in FIG. 35. Alternatively, each modulator may operate with the same wavelength, using a different electrical modulating signal input and, as a variation of both arrangements, a selected set of wavelengths (less than n) may also be used, with different electrical signals used with each set. In addition, the same electrical signal could be supplied to all of the modulators, each operating at a different wavelength. An alternative serial array configuration 150 is illustrated in FIG. 36, where the optical output from modulator 152-1 is then applied as the input to modulator 152-2, and so on, with the output from modulator 152-(N−1) applied as the input to modulator 152-N. The ability to so tightly control the fabrication conditions for such arrays is considered to be a significant advantage of the SISCAP electro-optic device of the present invention.

What is claimed is:

1. A silicon-based electro-optic device comprising:
a relatively thin silicon body region doped to exhibit a first conductivity type;
a relatively thin silicon gate region doped to exhibit a second conductivity type, the silicon gate region disposed at least in part over the silicon body region to define a contiguous area between said silicon body and gate regions;
a relatively thin dielectric layer disposed in the contiguous area between said silicon body and gate regions, the combination of said silicon body and gate regions with the interposed relatively thin dielectric layer defining the active region of the electro-optic device;
a first electrical contact coupled to said silicon gate region; and
a second electrical contact coupled to said silicon body region, wherein upon application of an electrical signal to the first and second electrical contacts, free carriers accumulate, deplete or invert within the silicon body and gate regions on both sides of the relatively thin dielectric layer at the same time, such that the optical electric field of said optical signal substantially overlaps with the free carrier concentration modulation area in the active region of said electro-optic device.

2. A silicon-based electro-optic device as defined in claim 1 wherein the relative placement of the silicon gate region with respect to the silicon body region is controlled, in combination with the doping concentrations and thickness of said silicon gate and body regions and the thickness of the dielectric layer, such that upon the application of an electrical signal to the first and second electrical contacts, the position of the free carrier concentration modulation peak near the dielectric layer substantially coincides with the position of the peak of the optical electric field.

3. A silicon-based electro-optic device as defined in claim 1 wherein the peak of the optical electric field is within one fourth of the total thickness of the silicon gate region as defined from the relatively thin dielectric layer and within one fourth of the total thickness of the silicon body region as defined from said relatively thin dielectric layer.

4. A silicon-based electro-optic device as defined in claim 3 wherein the peak of the optical electric field is within one eighth of the total thickness of the silicon gate region as defined from the relatively thin dielectric layer and within one eighth of the total thickness of the silicon body region as defined from said relatively thin dielectric layer.

5. A silicon-based electro-optic device as defined in claim 1 wherein the percentage of the optical electric field in the silicon gate region is substantially equal to the percentage of the optical electric field in the silicon body region.

6. A silicon-based electro-optic device as defined in claim 1 wherein
the relatively thin silicon gate region is defined as comprising a first portion associated with the active region and a second portion associated with the location of a first electrical contact region.

7. A silicon-based electro-optic device as defined in claim 6 wherein the second portion of the silicon gate region includes first and second separated areas disposed on either side of the first portion, with the first electrical contact region disposed in the first separated area and a third electrical contact region disposed in the second separated area.

8. A silicon-based electro-optic device as defined in claim 7 wherein the first and third electrical contact regions each comprise a silicide formed within the first and second areas of the second portion of the silicon gate region.

9. A silicon-based electro-optic device as defined in claim 8 wherein the silicide is chosen from the group consisting of tantalum silicide, cobalt silicide, titanium silicide, molybdenum silicide, tungsten silicide and nickel silicide.

10. A silicon-based electro-optic device as defined in claim 9 wherein the silicide is titanium silicide.

11. A silicon-based electro-optic device as defined in claim 7 wherein the first and third electrical contact regions each comprise a plurality of separate contact areas disposed at different locations along the first and second areas, respectively, of the second portion of the silicon gate region to reduce optical loss while providing low series resistance.

12. A silicon-based electro-optic device as defined in claim 7 wherein the silicon gate region is patterned to include a central longitudinal extent disposed to essentially cover the active device region, and at least two contact arms disposed orthogonal to said central longitudinal extent, each contact arm providing electric contact to the first and third electrical contact regions in the first and second areas of the second gate portion.

13. A silicon-based electro-optic device as defined in claim 7 wherein the silicon gate region is patterned to include a relatively wide longitudinal extent disposed to cover an extended central portion of the device extending beyond the active device region, the silicon gate region further patterned to form a plurality of contacts to the first and third electrical contact regions in the first and second areas of the second gate portion, and a plurality of openings to expose a plurality of contacts to the second and fourth electrical contact regions of the first and second areas of the second body portion.

14. A silicon-based electro-optic device as defined in claim 6 wherein the first portion of the silicon gate region is more lightly doped than the second portion of the silicon gate region to reduce optical loss in the first portion, the second portion being more heavily doped to provide a relatively low series resistance between the active region and the first electrical contact region.

15. A silicon-based electro-optic device as defined in claim 14 wherein the relatively low series resistance allows for high speed operation when driven by an electrical signal source having a relatively low output drive impedance.

16. A silicon-based electro-optic device as defined in claim 14 wherein the silicon gate region exhibits a graded dopant concentration increasing from the first portion to the second portion.

17. A silicon-based electro-optic device as defined in claim 6 wherein the silicon gate region exhibits a third portion disposed above the first portion, the third portion being more lightly doped than the first portion to reduce optical loss within the active portion.

18. A silicon-based electro-optic device as defined in claim 17 wherein the silicon gate region exhibits a graded dopant concentration decreasing from the first portion to the third portion.

19. A silicon-based electro-optic device as defined in claim 6 wherein the first portion of the silicon gate region exhibits a dopant concentration on the order of $10^{17}$ cm$^{-3}$ and the second portion of the silicon gate region exhibits a dopant concentration on the order of $10^{19}$ cm$^{-3}$.

20. A silicon-based electro-optic device as defined in claim 6 wherein the first electrical contact region comprises a silicide formed within the second portion of the silicon gate region.

21. A silicon-based electro-optic device as defined in claim 20 wherein the silicide is chosen from the group consisting of tantalum silicide, cobalt silicide, titanium silicide, molybdenum silicide, tungsten silicide and nickel silicide.

22. A silicon-based electro-optic device as defined in claim 6 wherein the first electrical contact region comprises a plurality of separate contact areas disposed at different locations along the second portion of the silicon gate region to reduce optical signal loss while providing low series resistance.

23. A silicon-based electro-optic device as defined in claim 1 wherein the thickness of the relatively thin silicon gate region is controlled to maintain the peak of the optical electric field at substantially the location of the relatively thin dielectric layer.

24. A silicon-based electro-optic device as defined in claim 1 wherein the relatively thin silicon gate region comprises a thickness less than one-half micron.

25. A silicon-based electro-optic device as defined in claim 24 wherein the relatively thin silicon gate region comprises a thickness less than 0.2 $\mu$m.

26. A silicon-based electro-optic device as defined in claim 1 wherein the relatively thin silicon gate region comprises one or more forms of silicon chosen from the group consisting of: polysilicon, amorphous silicon, grain-size-enhanced polysilicon, grain-boundary-passivated polysilicon, grain-aligned polysilicon, strained silicon, substantially single crystal silicon, $Si_xGe_{1-x}$ and single crystal silicon.

27. A silicon-based electro-optic device as defined in claim 26 wherein the relatively thin silicon gate region comprises a single layer of one form of silicon selected from the identified group.

28. A silicon-based electro-optic device as defined in claim 26 wherein the relatively thin silicon gate region comprises multiple layers of silicon, selected from one or more of the forms of silicon in the identified group.

29. A silicon-based electro-optic device as defined in claim 26 wherein the relatively thin silicon gate region comprises polysilicon.

30. A silicon-based electro-optic device as defined in claim 29 wherein the polysilicon comprises grain-size-enhanced polysilicon.

31. A silicon-based electro-optic device as defined in claim 30 wherein the grain-size-enhanced polysilicon is formed using a seed catalyst technique.

32. A silicon-based electro-optic device as defined in claim 30 wherein the grain-size-enhanced polysilicon is formed using a silicon implantation and anneal process.

33. A silicon-based electro-optic device as defined in claim 29 wherein the polysilicon comprises grain-boundary-passivated polysilicon.

34. A silicon-based electro-optic device as defined in claim 33 wherein the grain-boundary-passivated polysilicon is formed using a hydrogen anneal process.

35. A silicon-based electro-optic device as defined in claim 29 wherein the polysilicon comprises grain-aligned polysilicon.

36. A silicon-based electro-optic device as defined in claim 26 wherein the relatively thin silicon gate region comprises amorphous silicon.

37. A silicon-based electro-optic device as defined in claim 26 wherein the relatively thin silicon gate region comprises strained silicon.

38. A silicon-based electro-optic device as defined in claim 26 wherein the relatively thin silicon gate region comprises substantially single crystal silicon.

39. A silicon-based electro-optic device as defined in claim 26 wherein the relatively thin silicon gate region comprises $Si_xGe_{1-x}$.

40. A silicon-based electro-optic device as defined in claim 26 wherein the relatively thin silicon gate region comprises single crystal silicon.

41. A silicon-based electro-optic device as defined in claim 1 wherein the silicon gate region exhibits one or more rounded corner edges in the active device region to reduce optical signal loss.

42. A silicon-based electro-optic device as defined in claim 1 wherein the relatively thin silicon body region is defined as comprising a first portion associated with the active region and a second portion associated with the location of a second electrical contact region.

43. A silicon-based electro-optic device as defined in claim 42 wherein the second portion of the silicon body region includes first and second separated areas disposed on either side of the first portion, with the second electrical contact region disposed in the first separated area and a fourth electrical contact region disposed in the second separated area.

44. A silicon-based electro-optic device as defined in claim 43 wherein the second and fourth electrical contact regions each comprise a silicide formed within the first and second areas of the second portion of the silicon body region.

45. A silicon-based electro-optic device as defined in claim 44 wherein the silicide is chosen from the group consisting of tantalum silicide, cobalt silicide, titanium silicide, molybdenum silicide, tungsten silicide and nickel silicide.

46. A silicon-based electro-optic device as defined in claim 43 wherein the second and fourth electrical contact regions each comprise a plurality of separate contact areas disposed at different locations along the first and second areas, respectively, of the second portion of the silicon body region to reduce optical loss while providing low series resistance.

47. A silicon-based electro-optic device as defined in claim 42 wherein the first portion of the silicon body region is more lightly doped than the second portion of the silicon body region to reduce optical signal loss in the first portion, the second portion being more heavily doped to provide a relatively low series resistance between the active region and the second electrical contact region.

48. A silicon-based electro-optic device as defined in claim 47 wherein the relatively low series resistance allows for higher speed operation when driven by an electrical signal source having a relatively low output drive impedance.

49. A silicon-based electro-optic device as defined in claim 47 wherein the silicon body region exhibits a graded dopant concentration increasing from the first portion to the second portion.

50. A silicon-based electro-optic device as defined in claim 42 wherein the silicon body region exhibits a third portion disposed below the first portion, the third portion being more lightly doped than the first portion to reduce optical loss within the active region.

51. A silicon-based electro-optic device as defined in claim 50 wherein the silicon body region exhibits a graded dopant concentration decreasing from the first portion to the third portion.

52. A silicon-based electro-optic device as defined in claim 42 wherein the first portion of the silicon body region exhibits a dopant concentration on the order of $10^{17}$ cm$^{-3}$ and the second portion of the silicon body region exhibits a dopant concentration on the order of $10^{19}$ cm$^{-3}$.

53. A silicon-based electro-optic device as defined in claim 42 wherein the second electrical contact region comprises a silicide formed within the second portion of the silicon body region.

54. A silicon-based electro-optic device as defined in claim 42 wherein the silicide is chosen from the group consisting of tantalum silicide, cobalt silicide, titanium silicide, molybdenum silicide, tungsten silicide and nickel silicide.

55. A silicon-based electro-optic device as defined in claim 42 wherein the second electrical contact region comprises a plurality of separate contact areas disposed at different locations along the second portion of the silicon body region to reduce optical signal loss while providing low series resistance.

56. A silicon-based electro-optic device as defined in claim 1 wherein the thickness of the relatively thin silicon body region is controlled to maintain the peak of the optical electric field at substantially the location of the relatively thin dielectric layer.

57. A silicon-based electro-optic device as defined in claim 1 wherein the relatively thin silicon body region comprises a thickness of less than one-half micron.

58. A silicon-based electro-optic device as defined in claim 57 wherein the relatively thin silicon body region comprises a thickness of less than 0.2 µm.

59. A silicon-based electro-optic device as defined in claim 1 wherein the relatively thin silicon body region comprises one or more forms of silicon chosen from the group consisting of: partially-depleted silicon, fully-depleted silicon, strained silicon, substantially single crystal silicon, $Si_xGe_{1-x}$ and single crystal silicon.

60. A silicon-based electro-optic device as defined in claim 59 wherein the relatively thin silicon body region comprises a single layer of one form of silicon selected from the identified group.

61. A silicon-based electro-optic device as defined in claim 59 wherein the relatively thin silicon body region comprises multiple layers of silicon, selected from one or more of the forms of silicon in the identified group.

62. A silicon-based electro-optic device as defined in claim 59 wherein the relatively thin silicon body region comprises partially-depleted silicon.

63. A silicon-based electro-optic device as defined in claim 59 wherein the relatively thin silicon body region comprises fully-depleted silicon.

64. A silicon-based electro-optic device as defined in claim 59 wherein the relatively thin silicon body region comprises strained silicon.

65. A silicon-based electro-optic device as defined in claim 59 wherein the relatively thin silicon body region comprises substantially single crystal silicon.

66. A silicon-based electro-optic device as defined in claim 59 wherein the relatively thin silicon body region comprises $Si_xGe_{1-x}$.

67. A silicon-based electro-optic device as defined in claim 59 wherein the relatively thin silicon body region comprises single crystal silicon.

68. A silicon-based electro-optic device as defined in claim 1 wherein the silicon body region exhibits one or more rounded corner edges in the active device region to reduce optical signal loss.

69. A silicon-based electro-optic device as defined in claim 1 wherein the silicon body region exhibits p-type conductivity and the silicon gate region exhibits n-type conductivity.

70. A silicon-based electro-optic device as defined in claim 1 wherein the silicon body region exhibits n-type conductivity and the silicon gate region exhibits p-type conductivity.

71. A silicon-based electro-optic device as defined in claim 1 wherein the silicon body region exhibits both n-type and p-type conductivity, with the concentration of the electrons being greater than the concentration of the holes, and the silicon gate region exhibits both n-type and p-type conductivity, with the concentration of the holes being greater than the concentration of electrons, the differences in concentration sufficient to provide for free carrier movement upon application of an electrical signal.

72. A silicon-based electro-optic device as defined in claim 1 wherein the silicon body region exhibits both n-type and p-type conductivity, with the concentration of the holes being greater than the concentration of the electrons, and the silicon gate region exhibits both n-type and p-type conductivity, with the concentration of electrons being greater than the concentration of holes, the differences in concentration sufficient to provide for free carrier movement upon application of an electrical signal.

73. A silicon-based electro-optic device as defined in claim 1 wherein the relatively thin dielectric layer comprises a material exhibiting rapid charge and discharge of free carriers within the silicon gate and body regions on both sides of said relatively thin dielectric layer.

74. A silicon-based electro-optic device as defined in claim 73 wherein the relatively thin dielectric layer comprises a single layer formed of one material.

75. A silicon-based electro-optic device as defined in claim 73 wherein the relatively thin dielectric layer comprises a plurality of sub-layers comprising at least one material.

76. A silicon-based electro-optic device as defined in claim 73 wherein the dielectric is chosen from the group consisting of: silicon dioxide, silicon nitride, oxynitride, bismuth oxide, hafnium oxide, and any combination thereof.

77. A silicon-based electro-optic device as defined in claim 1 wherein the relatively thin dielectric layer comprises a thickness of no more than 1000 Å.

78. A silicon-based electro-optic device as defined in claim 77 wherein the relatively thin dielectric layer comprises a thickness of no more than 200 Å.

79. A silicon-based electro-optic device as defined in claim 1 wherein the device further comprises a surrounding region exhibiting a lower effective refractive index than the active region, the surrounding region disposed such that the effective refractive index decreases away from the active region to provide substantial vertical and horizontal optical signal confinement within the electro-optic device.

80. A silicon-based electro-optic device as defined in claim 79 wherein the surrounding region comprises one or more materials chosen from the group consisting of silicon dioxide, silicon nitride or silicon.

81. A silicon-based electro-optic device as defined in claim 1 wherein the device comprises an electro-optic phase modulator, with an electrical modulating signal applied to the first and second electrical contacts, the modulator drawing substantially zero DC power during operation.

82. A silicon-based electro-optic device as defined in claim 81 wherein the device is a low power device, drawing substantially zero DC power during operation and drawing AC power essentially only during the transitions between optical "1" and optical "0" phase conditions.

83. A silicon-based electro-optic device as defined in claim 81 wherein the device is a defined as a low voltage device, operating with an electrical modulating signal input voltage of a value less than or equal to a supply voltage consistent with the integral CMOS transistor technology.

84. A silicon-based electro-optic device as defined in claim 81 wherein the device is a defined as a low voltage device, operating with an electrical modulating signal input voltage of a value less than 2V.

85. A silicon-based electro-optic device as defined in claim 81 wherein the device comprises an active length along the optical propagation direction of no more than 2 millimeters.

86. A silicon-based electro-optic device as defined in claim 1 wherein the device comprises a plurality of electro-optic phase modulators, with at least one electrical modulating signal applied as an input to at least one of the first and second electrical contacts.

87. A silicon-based electro-optic device as defined in claim 86 wherein the plurality of electro-optic phase modulators comprises a parallel array of electro-optic phase modulators.

88. A silicon-based electro-optic device as defined in claim 86 wherein the plurality of electro-optic phase modulators comprises a serial connection of electro-optic phase modulators.

89. A silicon-based electro-optic device as defined in claim 1 wherein the electro-optic device is formed as part of a silicon-on-insulator (SOI) arrangement including a silicon substrate, a buried dielectric layer and a relatively thin surface silicon layer, with the silicon body region of said electro-optic device formed within the relatively thin surface silicon layer.

90. A silicon-based electro-optic device as defined in claim 89 wherein the buried dielectric layer comprises a material with a lower refractive index than silicon and provides for optical confinement within the relatively thin silicon body region formed in the SOI surface silicon layer.

91. A silicon-based electro-optic device as defined in claim 89 wherein the buried dielectric layer comprises a thickness associated with achieving substantially low optical loss.

92. A silicon-based electro-optic device as defined in claim 91 wherein the buried dielectric layer comprises a thickness of at least 0.2 microns.

93. A silicon-based electro-optic device as defined in claim 89 wherein the relatively thin surface silicon layer comprises a thickness no greater than one-half micron.

94. A silicon-based electro-optic device as defined in claim 93 wherein the relatively thin surface silicon layer comprises a thickness no greater than 0.2 $\mu$m.

95. A silicon-based electro-optic device as defined in claim 1 wherein the silicon gate region comprises a shape including an input, increasing taper along a portion of the device where an optical signal is coupled into the active region, the input taper to minimize optical signal reflections at the input of the electro-optic device.

96. A silicon-based electro-optic device as defined in claim 95 wherein the input, increasing taper is essentially undoped.

97. A silicon-based electro-optic device as defined in claim 95 wherein the input taper is a one-dimensional taper in same direction as the optical signal propagation direction.

98. A silicon-based electro-optic device as defined in claim 95 wherein the input taper is a two-dimensional taper including a first dimension taper in the same direction as the optical signal propagation and a second dimension taper in a direction perpendicular to the optical signal propagation direction.

99. A silicon-based electro-optic device as defined in claim 95 wherein the device further comprises an angled silicon body region, the angled silicon body region having a shape such that an overlap between the angled silicon body region and the tapered silicon gate region reduces corner reflections and provides optical mode matching at the input of the electro-optic device.

100. A silicon-based electro-optic device as defined in claim 99 wherein the angled silicon body region is patterned to angle in opposition to the input and output tapers of the silicon gate region such that the overlap between the opposing directions of the body and gate regions is used to control and define the width of the active device region.

101. A silicon-based electro-optic device as defined in claim 1 wherein the silicon gate region comprises a shape including an output, decreasing taper along a portion of the device where an optical signal is coupled out of the active region, the output taper to minimize optical signal reflections at the output of the electro-optic device.

102. A silicon-based electro-optic device as defined in claim 101 wherein the output, decreasing taper is essentially undoped.

103. A silicon-based electro-optic device as defined in claim 101 wherein the output taper is a one-dimensional taper in same direction as the optical signal propagation direction.

104. A silicon-based electro-optic device as defined in claim 101 wherein the output taper is a two-dimensional taper including a first dimension taper in the same direction as the optical signal propagation and a second dimension taper in a direction perpendicular to the optical signal propagation direction.

105. A silicon-based electro-optic device as defined in claim 101 wherein the device further comprises an angled silicon body region, the angled silicon body region having a shape such that an overlap between the angled silicon body region and the tapered silicon gate region reduces corner reflections and provides optical mode matching at the output of the electro-optic device.

106. A silicon-based electro-optic device as defined in claim 105 wherein the angled silicon body region is patterned to angle in opposition to the input and output tapers of the silicon gate region such that the overlap between the opposing directions of the body and gate regions is used to control and define the width of the active device region.

107. A silicon-based electro-optic device as defined in claim 106 wherein the overlap may be defined to comprise a width less than the individual layer minimum design width rules used to form the electro-optic device.

108. A silicon-based electro-optic device as defined in claim 1 wherein the silicon body region comprises a shape including an input, decreasing taper along a portion of the device where an optical signal is coupled into the active region to provide optical mode matching into the electro-optic device.

109. A silicon-based electro-optic device as defined in claim 108 wherein the input, decreasing taper is essentially undoped.

110. A silicon-based electro-optic device as defined in claim 108 wherein the input taper is a one-dimensional taper in the same direction as the optical signal propagation direction.

111. A silicon-based electro-optic device as defined in claim 1 wherein the silicon body region comprises a shape including an output, increasing taper along a portion of the device where an optical signal is coupled out of the active region to provide optical mode matching out of the electro-optic device.

112. A silicon-based electro-optic device as defined in claim 111 wherein the output, increase taper is essentially undoped.

113. A silicon-based electro-optic device as defined in claim 111 wherein the output taper of the silicon body region is a one-dimensional taper in the same direction as the optical signal propagation direction.

114. A Mach-Zehnder interferometer comprising an input optical waveguide splitter, defined as comprising an input waveguide section optically coupled to both a first arm and a second arm, said first and second arms disposed in parallel; and an output optical waveguide combiner, defined as comprising an output waveguide section optically coupled to the input optical waveguide splitter first and second arms, wherein the first arm includes a first electro-optic phase modulator comprising:

a relatively thin silicon body region doped to exhibit a first conductivity type;

a relatively thin silicon gate region doped to exhibit a second conductivity type, the silicon gate region disposed at least in part over the silicon body region to define a contiguous area between said silicon body and gate regions;

a relatively thin dielectric layer disposed in the contiguous area between said silicon body and gate regions, the combination of said silicon body and gate regions with the interposed relatively thin dielectric layer defining the active region of the electro-optic device;

a first electrical contact coupled to said silicon gate region; and a second electrical contact coupled to said silicon body region, wherein upon application of an electrical signal to the first and second electrical contacts, free carriers accumulate, deplete or invert within the silicon body and gate regions on both sides of the relatively thin dielectric layer at the same time, such that the optical electric field of said optical signal substantially overlaps with the free carrier concentration modulation area in the active region of said first electro-optic phase modulator device.

115. A Mach-Zehnder interferometer as defined in claim 114 wherein the interferometer further comprises a second electro-optic modulator disposed along the second arm, said second electro-optic modulator comprising a relatively thin silicon body region doped to exhibit a first conductivity type;

a relatively thin silicon gate region doped to exhibit a second conductivity type, the silicon gate region disposed at least in part over the silicon body region to define a contiguous area between said silicon body and gate regions;

a relatively thin dielectric layer disposed in the contiguous area between said silicon body and gate regions, the combination of said silicon body and gate regions with the interposed relatively thin dielectric layer defining the active region of the electro-optic device;

a first electrical contact coupled to said silicon gate region; and a second electrical contact coupled to said silicon body region, wherein upon application of an electrical signal to the first and second electrical contacts, free carriers accumulate, deplete or invert within the silicon body and gate regions on both sides of the relatively thin dielectric layer at the same time, such that the optical electric field of said optical signal substantially overlaps with the free carrier concentration modulation area in the active region of said second electro-optic modulator.

116. A Mach-Zehnder interferometer as defined in claim 115 wherein the first arm operates in depletion mode and the second arm operates in accumulation mode.

117. A Mach-Zehnder interferometer as defined in claim 115 wherein the first arm operates in accumulation mode and the second arm operates in depletion mode.

118. A Mach-Zehnder interferometer as defined in claim 115 wherein both the first and second arms operate in depletion mode.

119. A Mach-Zehnder interferometer as defined in claim 115 wherein both the first and second arms operate in accumulation mode.

120. A Mach-Zehnder interferometer as defined in claim 115 wherein both the first and second arms operate in inversion mode.

121. A Mach-Zehnder interferometer as defined in claim 115 wherein the Mach-Zehnder interferometer is balanced and symmetric such that the active length along the optical propagation direction of the first arm is essentially equal to the active length along the optical propagation direction of the second arm.

122. A Mach-Zehnder interferometer as defined in claim 115 wherein the Mach-Zehnder interferometer comprises an asymmetric construction between the first and second arms.

123. A Mach-Zehnder interferometer as defined in claim 122 wherein the active length along the optical propagation direction of the first arm is unequal to the active length along the optical propagation direction of the second arm.

124. A Mach-Zehnder interferometer as defined in claim 122 wherein the first arm comprises a plurality of N separate electro-optic modulators and the second arm comprises a plurality of M separate electro-optic modulators, where N≠M.

125. A Mach-Zehnder interferometer as defined in claim 122 wherein the first arm comprises a plurality of N separate electro-optic modulators and the second arm comprises a plurality of M separate electro-optic modulators, where N=M.

126. A Mach-Zehnder interferometer as defined in claim 122 wherein the dopant concentration in the first arm is different than the dopant concentration in the second arm.

127. A Mach-Zehnder interferometer as defined in claim 122 wherein the input optical waveguide splitter presents a ratio of input optical signal power other than 50:50 to the first and second arms.

128. A Mach-Zehnder interferometer as defined in claim 115 wherein the first electro-optic modulator disposed along the first arm is formed such that the silicon gate region is located on the exterior of the first arm optical waveguide and the silicon body region is located on the interior of said first arm optical waveguide; and the second electro-optic modulator disposed along the second arm is formed such that the silicon body region is located on the exterior of the first arm optical waveguide and the silicon gate region is located on the interior of said second arm optical waveguide.

129. A Mach-Zehnder interferometer as defined in claim 114 wherein the input and output optical waveguides are formed in the relatively thin silicon layer used to form the body region.

130. A Mach-Zehnder interferometer as defined in claim 114 wherein the relatively thin silicon gate region comprises a form of silicon capable of supporting optical transmission and the input and output optical waveguides are formed at least in part in said relatively thin silicon gate region.

131. A Mach-Zehnder interferometer as defined in claim 114 wherein the input and output optical waveguides are formed by a combination of the silicon gate region, the relatively thin gate dielectric layer and the silicon body region, the combination as defined by the active device region.

132. A Mach-Zehnder interferometer as defined in claim 114 wherein the Mach-Zehnder interferometer comprises a plurality of separate interferometers disposed in a predetermined combination.

133. A Mach-Zehnder interferometer as defined in claim 132 wherein the plurality of Mach-Zehnder interferometers are disposed in a parallel configuration.

134. A Mach-Zehnder interferometer as defined in claim 132 wherein the plurality of Mach-Zehnder interferometers are disposed in a serial configuration.

* * * * *